United States Patent
Berger et al.

(10) Patent No.: US 11,870,223 B2
(45) Date of Patent: Jan. 9, 2024

(54) METHOD FOR REMOVING A SHIELDING FOIL OF AN ELECTRICAL CABLE BY MEANS OF A ROTARY STRIPPING MACHINE, AND DEVICE FOR SUPPORTING THE REMOVAL OF A SHIELDING FOIL OF AN ELECTRICAL CABLE

(71) Applicant: Schleuniger AG, Thun (CH)

(72) Inventors: Patrick Berger, Steffisburg (CH);
Raphael Deschler, Oberhofen (CH);
Michael Jost, Thun (CH)

(73) Assignee: Schleuniger AG, Thun (CH)

( * ) Notice: Subject to any disclaimer, the term of this patent is extended or adjusted under 35 U.S.C. 154(b) by 0 days.

(21) Appl. No.: 17/312,462

(22) PCT Filed: Jul. 9, 2019

(86) PCT No.: PCT/EP2019/068425
§ 371 (c)(1),
(2) Date: Jun. 10, 2021

(87) PCT Pub. No.: WO2020/119960
PCT Pub. Date: Jun. 18, 2020

(65) Prior Publication Data
US 2022/0060003 A1 Feb. 24, 2022

(30) Foreign Application Priority Data
Dec. 14, 2018 (WO) .................. PCT/EP2018/084903

(51) Int. Cl.
*H02G 1/12* (2006.01)
(52) U.S. Cl.
CPC ................ *H02G 1/1265* (2013.01)

(58) Field of Classification Search
CPC ............................ H02G 1/1265; H02G 1/12
(Continued)

(56) References Cited

U.S. PATENT DOCUMENTS

| | | | |
|---|---|---|---|
| 4,815,207 A | 3/1989 | Schwartzman | |
| 8,739,657 B2 * | 6/2014 | Nakamura | ........... H02G 1/1202 81/9.51 |

(Continued)

FOREIGN PATENT DOCUMENTS

| | | |
|---|---|---|
| DE | 102007053825 A1 | 5/2009 |
| DE | 202008017576 U1 | 2/2010 |

(Continued)

OTHER PUBLICATIONS

International Search Report in PCT/EP2019/068425 dated Oct. 17, 2019, 8 pages.

*Primary Examiner* — Nhat Chieu Q Do
(74) *Attorney, Agent, or Firm* — Pearne & Gordon LLP

(57) ABSTRACT

A method for removing a shielding foil of an electrical cable includes creating an incision of a first depth in an insulating sheath of the electrical cable wherein the first depth is smaller than or the same as the thickness of the insulating sheath; creating a predetermined breaking point in the shielding foil through at least one radially adjustable perforation tool until the perforation tool has reached a second depth, wherein the second depth corresponds to at least the thickness of the insulating sheath plus at least half of the thickness of the shielding foil; tearing the shielding foil at the predetermined breaking point; and removing the shielding foil.

23 Claims, 14 Drawing Sheets

(58) Field of Classification Search
USPC .......................................................... 83/862
See application file for complete search history.

(56) References Cited

U.S. PATENT DOCUMENTS

| | | | |
|---|---|---|---|
| 2010/0251857 A1 | 10/2010 | Whittaker et al. | |
| 2016/0126707 A1* | 5/2016 | Ishigure | H02G 1/1265 83/873 |
| 2016/0322792 A1* | 11/2016 | Dober | H02G 1/127 |
| 2018/0138673 A1 | 5/2018 | Messina et al. | |
| 2020/0076174 A1* | 3/2020 | Numazawa | H02G 1/1268 |
| 2021/0273426 A1* | 9/2021 | Khu | H02G 1/1265 |

FOREIGN PATENT DOCUMENTS

| | | | | |
|---|---|---|---|---|
| EP | 0673099 B1 | | 9/1995 | |
| EP | 2693581 A1 * | | 2/2014 | H02G 1/12 |
| EP | 2976818 B1 | | 1/2016 | |
| EP | 3089294 B1 | | 11/2016 | |
| EP | 3125382 B1 | | 2/2017 | |
| EP | 3447865 A1 | | 2/2019 | |
| JP | 2000092644 A | | 3/2000 | |
| JP | 3469398 B2 | | 11/2003 | |
| WO | WO-2014147596 A1 * | | 9/2014 | G01N 27/228 |
| WO | 2018060880 A1 | | 4/2018 | |

* cited by examiner

METHOD FOR REMOVING A SHIELDING FOIL OF AN ELECTRICAL CABLE BY MEANS OF A ROTARY STRIPPING MACHINE, AND DEVICE FOR SUPPORTING THE REMOVAL OF A SHIELDING FOIL OF AN ELECTRICAL CABLE

TECHNICAL FIELD

The present invention relates to a method for removing a shielding foil of an electrical cable. More specifically the invention relates to a method for removing a shielding foil of an electrical cable by means of a rotary stripping machine. In particular the invention relates to a method for removing a partially insulating and partially conductive shielding foil of an electrical cable by means of a rotary stripping machine. The present invention relates furthermore to a device for supporting the removal of a shielding foil.

STATE OF THE ART

The processing of the cable ends of electrical cables, in particular coaxial cables with a shielding foil, is a multi-step process, starting with cutting to length by cutting or sawing of the cable all the way to crimping a connector on the inner conductor. A sub-step of this process is the removal of the shielding foil, which is usually wound in a spiral around the metallic shielding braid of the electrical cable. The removal of the shielding foil, which usually consists of a PET-coated aluminum foil, is a complicated procedure because the shielding foil is usually very thin and in certain places is double-layered due to its overlapping.

In the above-mentioned cable end processing method until today usually the insulation is cut into and removed down to the shielding foil. The shielding foil is normally then removed manually. Manual removal of the foil is fraught with uncertainties, and a constant processing quality cannot be guaranteed. Moreover this step carried out by hand takes significantly longer than if this step is part of an automatic process, and is therefore associated with higher long-term costs.

In the case of a common coaxial cable, in which no shielding foil is present, stripping is carried out stepwise. Usually the first incision cuts through the outer protective sheath and the screen or shield, whereupon the separated layers are removed immediately. Afterwards the dielectric is cut to the inner conductor and is partially or completely removed. The protective sheath is then cut down to the screen or shield and is partially or completely removed. A partial removal protects the screen or shield or the inner conductor, for example against fraying or oxidizing until further processing of the cable.

In the case of a cable with a shielding foil, the removal of the insulating sheath can be carried out with a rotary stripping machine known from the state of the art. Afterwards the shielding foil is manually unwound and cut off to the desired point. As explained above, the removal of the usually thin shielding foil presents a special challenge since, unlike the insulation, it cannot be incised rotatively since the rotary cutting of the shielding foil, owing to the out-of-roundness of the cable, would usually lead to undesired damage to the shielding braid.

Known from the state of the art are methods and apparatuses that support the removal of the metallic shielding or the shielding foil of a coaxial cable through a thermal treatment of the shielding or foil to be removed. The known methods based on a supporting thermal treatment of the shielding foil do not always lead to satisfactory, or above all reproducible, results.

Starting from the state of the art, the object of the present invention is therefore to overcome the mentioned drawbacks and to propose a method for removing a shielding foil of an electrical cable which makes it possible to remove the shielding foil satisfactorily and in a reproducible way with an automated process, and thereby damage the underlying metallic shielding braid as little as possible. A further object of the present invention is to propose a device for supporting the removal of a shielding foil of an electrical cable.

SUMMARY OF INVENTION

These objects are achieved according to the present invention above all through the elements of the two independent claims. Further advantageous embodiments follow moreover from the dependent claims and the description.

In particular the objects of the present invention are achieved through a method for removing a shielding foil of an electrical cable with a longitudinal axis, which cable has, going out from the longitudinal axis outward, at least one inner conductor, a dielectric, the shielding foil and an insulating sheath, comprising the following steps:

a. Creating an incision of a first depth in the insulating sheath of the electrical cable, for example by means of the rotating blades of a rotary stripping device, whereby the first depth is smaller than or the same as the thickness of the insulating sheath;

b. Creating a predetermined breaking point in the shielding foil through pressing in of at least one radially adjustable perforation tool through the incision produced in step a. until the perforation tool has reached a second depth, whereby the second depth corresponds to at least the thickness of the insulating sheath plus at least half of the thickness of the shielding foil;

c. Tearing the shielding foil at the predetermined breaking point (S); and d. Removing the shielding foil.

The inventors have discovered that it is advantageous to create the predetermined breaking point in the shielding foil by pressing in at least one radially adjustable perforation tool through an incision in the insulating sheath of the electrical cable. The incision is created preferably by means of a rotary stripping device.

In a first preferred embodiment of the method according to the invention, between the steps b. and c. or between the steps c. and d. the perforation tool is put back in a position outside of the insulating sheath. The removal can thereby take place more easily; among other things the cable can be bent in order to allow the shielding foil to tear at the predetermined breaking point. If the perforation tool were still situated in the incision, a bending of the cable would lead, for example, to damage of the shielding braid.

In a further preferred embodiment of the method according to the invention, between steps a. and b., the insulating sheath is partially or completely removed. If necessary, a perforation tool can thereby be used that is larger than the width of the incision created in the insulating sheath. During the partial removal or the complete removal of the insulating sheath, any contact of the blades of the rotary stripping machine with the shielding foil or with the shielding braid is preferably detected, if the removal is carried out, for example, with the rotary stripping device. Damage to the shielding foil or to the shielding braid can thereby be ascertained.

In another preferred embodiment of the method according to the invention, the shielding foil consists at least partially of metal whereby the perforation tool is connected to means for detection of a contact with an electrically conductive object and whereby the pressing in of the perforation tool is stopped as soon as a contact of the perforation tool with the shielding foil is detected. It can thereby be ensured that a sufficiently deep predetermined breaking point is made in the shielding foil.

In another preferred embodiment of the method according to the invention, the cable has a shielding braid between dielectric and shielding foil, and whereby the pressing in of the perforation tool is stopped as soon as a contact of the perforation tool with the shielding foil or the shielding braid is detected. It can thereby be ensured that the pressing in with the perforation tool is stopped if a contact either with the metallic part of the shielding foil or with the shielding braid of the cable is detected. Damage to the shielding braid can thereby be prevented.

In another preferred embodiment of the method according to the invention, the relative position of the perforation tool with respect to the longitudinal axis during the detection of a contact of the perforation tool with the shielding foil or with the shielding braid is transmitted to an analysis device. The position of the perforation tool can thereby be noted, which can be used for statistical purposes. For example, a statistical analysis of the diameter at which a contact with the shielding foil or respectively with the shielding braid is detected can be carried out. Such an analysis can be used for an optimization of the process or can be advantageous for evaluating the quality of a cable set.

In still another preferred embodiment of the method according to the invention, after detection of a contact with the shielding foil or with the shielding braid, the perforation tool is advanced radially by a predetermined value in the direction of the inner conductor of the electrical cable. The perforation tool can thereby be advanced by a predetermined value. The predetermined value can correspond, for example, to the thickness of the shielding foil, or a fraction of the diameter of the cable or any other characteristic value of the cable.

In another preferred embodiment of the method according to the invention, step b. is repeated at least once after the perforation tool has been driven back and has been rotated about the electrical cable by an adjustment angle. It can thereby be ensured that the predetermined breaking point is created along a sufficiently long length of the shielding foil, preferably along the entire length of the shielding foil.

In another preferred embodiment of the method according to the invention, the perforation tool is a blade of a rotary stripping device, whereby the blade does not rotate during step b. Thus only one device is needed to create the incision in the insulating sheath and the predetermined breaking point in the shielding foil.

In a further preferred embodiment of the method according to the invention, the perforation tool is a needle. A predetermined breaking point can thereby be created in an especially simple way through perforation.

In a further preferred embodiment of the method according to the invention, the needle is spring loaded. It can thereby be ensured that the shielding braid is not damaged by the needle.

In a further preferred embodiment of the method according to the invention, the perforation tool is ultrasonically excited. A predetermined breaking point can thereby be created in an especially simple way through friction or heat and without pressure on the shielding foil and therefore without pressure on the shielding braid. Damage to the shielding foil can thereby be prevented. Furthermore the shape and the sharpness of the perforation tool can be adapted to the shielding foil to be removed.

In another preferred embodiment of the method according to the invention, the ultrasonic excitation has a frequency between 10 and 100 kHz, preferably between 20 and 80 kHz, preferably between 30 and 50 kHz. The excitation frequency of the perforation tool can thus be adapted to the shielding foil to be removed. In particular, the frequency can be selected based on the material of the shielding foil and/or its thickness. Selected preferably will be the frequency which makes possible an efficient creation of the predetermined breaking point but ensures as little damage to the shielding braid as possible.

In a further preferred embodiment of the method according to the invention, step c. and/or step d. is carried out by means of a removal device, which comprises clamping jaws for clamping the insulating sheaths of the electrical cable or the shielding foil, whereby through a translational and/or rotational movement of the clamping jaws the shielding foil tears at the predetermined breaking point. Through employment of such a removal device the removal process can take place in an especially simple way.

In another preferred embodiment of the method according to the invention, between step c. and d. and/or during step c. the clamping jaws carry out a reciprocating movement around the longitudinal axis. During removal from the shielding braid the shielding foil is thereby loosened again and again so that it is able to be pulled off more easily.

In another preferred embodiment of the method according to the invention, with the reciprocating movement of the clamping jaws around the longitudinal axis, first a movement against the winding direction of the shielding braid is carried out. The initial static friction between shielding foil and shielding braid can thereby be overcome so that the shielding foil can be removed especially easily.

In another preferred embodiment of the method according to the invention, through the movement of the clamping jaws the cable with the shielding foil is bent at the predetermined breaking point. The tearing of the shielding foil can thereby be produced at the predetermined breaking point in an easy way.

In another preferred embodiment of the method according to the invention, the clamping jaws move in a circular or helical way relative to the longitudinal axis of the electrical cable. The removal process and the tearing of the shielding foil at the predetermined breaking point can thereby take place in an especially easy way.

In a further preferred embodiment of the method according to the invention, the clamping jaws of the removal device are installed on a gimbal or Cardan suspension. The clamping jaws can thereby move in a helical way about the axis of the cable and the shielding foil can be bent at the predetermined breaking point. Preferably the clamping jaws in the gimbal suspension are driven hydraulically with a flow divider or with a counter-rotating spindle so that the clamping jaws are always driven symmetrically with respect to the longitudinal axis.

In a further preferred embodiment of the method according to the invention, the surface of the clamping jaws coming into contact with the insulating sheath of the electrical cable or with the shielding foil is composed of a particular material such that the coefficient of static friction prevailing between the clamping jaws and the insulating sheath is greater than that between a metal and the insulating sheath. The clamping jaws can thereby clamp the insulating sheath particularly well and create a sufficiently great tension on the predetermined breaking point of the shielding foil.

In another preferred embodiment of the method according to the invention, the surface of the clamping jaws coming into contact with the insulating sheath of the electrical cable or with the shielding foil consists of an elastomer. The coefficient of static friction between insulating sheath and clamping jaws can thereby be increased in a simple way. Furthermore thanks to the elastomer the cable will not be deformed by the clamping.

In a further preferred embodiment of the method according to the invention, the clamping jaws have means to generate a suction force on the insulating sheath of the electrical cable or on the shielding foil. The clamping jaws can thereby clamp the insulating sheath particularly well and create a sufficiently great tension on the predetermined breaking point of the shielding foil.

In another preferred embodiment of the method according to the invention, the surface of the clamping jaws coming into contact with the insulating sheath of the electrical cable or with the shielding foil has a structure increasing static friction The clamping jaws can thereby clamp the insulating sheath especially well and also create a sufficiently great tension on the predetermined breaking point of the shielding foil.

In another preferred embodiment of the method according to the invention, the removed portion of the insulating sheath of the electrical cable is separated from the clamping jaws by means of compressed air and/or by means of an ejector pin. The removed part of the insulating sheath can thereby be simply removed from the clamping jaws.

The objects of the present invention are achieved furthermore through a device for supporting the removal of a shielding foil of an electrical cable comprising a first toothed belt wheel, and a second toothed belt wheel, which are coaxially and synchronously rotatable about a rotational axis but in an angularly adjustable way with respect to one another as well as a tool flange coaxially connected to the first toothed belt wheel, in which tool flange a central opening is disposed, through which a cable is able to be led or passed, whereby the tool flange comprises one or more movably attached tools, whereby the tools are movable with respect to the common rotational axis of the first toothed belt wheel and of the second toothed belt wheel through the setting means connected to the second toothed belt wheel, whereby the radial distance of the tools to the common rotational axis of the first toothed belt wheel and of the second toothed belt wheel is adjustable through an angular rotation between the first toothed belt wheel and the second toothed belt wheel, which are driven by a common drive means.

With such a device it is possible, to adjust precisely the radial distance of the tools, which cut, center or hold a cable, in relation to the rotational axis of the device with only an angular rotation between the first toothed belt wheel and the second toothed belt wheel. Furthermore the device requires only one drive means for the synchronous driving of the first toothed belt wheel and of the second toothed belt wheel. Thus, in contrast to known apparatuses, there is no risk that the toothed belt wheels over time no longer rotate synchronously, which would lead, for example, to imprecise incision diameters.

In a preferred embodiment of the present invention, the apparatus comprises a third toothed belt wheel and a fourth toothed belt wheel, which are drivable by the drive means, whereby the first toothed belt wheel is drivable by the third toothed belt wheel via a first toothed belt and the second toothed belt wheel is drivable by the fourth toothed belt wheel via a second toothed belt. It is thereby easy to allow the first toothed belt wheel and the second toothed belt wheel to rotate synchronously. It is also possible to construct the apparatus very compactly and in a space-saving way. Furthermore it is thereby possible to arrange the third toothed belt wheel and the fourth toothed belt wheel either coaxially or non-coaxially. The exact construction design of the apparatus according to the invention can thus be selected in a very flexible way.

In a further preferred embodiment of the present invention, the apparatus comprises at least one deflection roller and one tensioning roller, which deflect, preferably waist, the second toothed belt, whereby the angular rotation between the first toothed belt wheel and the second toothed belt wheel is achievable through a position change of the deflection roller and/or the tensioning roller. It is thereby possible, with only a position change of the deflection roller and/or the tensioning roller, for example a purely translational movement, to produce the angular rotation between the first toothed belt wheel and the second toothed belt wheel and thus to change the position of the tools in relation to the rotational axis of the apparatus. The apparatus can thereby be constructed very compactly.

In a further preferred embodiment of the present invention, the third toothed belt wheel and the fourth toothed belt wheel are united. This presents an even simpler construction design of the apparatus.

In another preferred embodiment of the present invention, the apparatus comprises a deflection belt kept under tension, which connects the third toothed belt wheel and the fourth toothed belt wheel, and moreover a first movable deflection roller, which is disposed along the deflection belt between the third toothed belt wheel and the fourth toothed belt wheel and deflects the deflection belt, whereby the angular rotation between the first toothed belt wheel and the second toothed belt wheel is achievable through a position change of the first movable deflection roller. It is thereby possible with only a position change of the first movable deflection roller, for example with a purely translational movement, to produce the angular rotation between the first toothed belt wheel and the second toothed belt wheel and thus to change the position of the tools in relation to the rotational axis of the apparatus. Thanks to the position of the first movable deflection roller between the third toothed belt wheel and the fourth toothed belt wheel, the tension of the first toothed belt or of the second toothed belt is not dependent upon the position of the deflection roller. The advance of the tools can thereby take place more precisely and the angular rotation between the first toothed belt wheel and the second toothed belt wheel can be designed bigger.

In another preferred embodiment of the present invention, the center of the first movable deflection roller is always disposed on the perpendicular bisector between the center of the third toothed belt wheel and the center of the fourth toothed belt wheel, and the diameter of the first movable deflection roller corresponds to the peripheral distance between the third toothed belt wheel and the fourth toothed belt wheel. With such a configuration, the section of the deflection belt between the third toothed belt wheel and the first movable deflection roller runs parallel to the section of the deflection belt between the first movable deflection roller and the fourth toothed belt wheel. A linear relationship thus results between the amount of position change of the first movable deflection roller and the angular rotation between the first toothed belt wheel and the second toothed belt wheel.

In another preferred embodiment of the present invention, the apparatus comprises at least one first non-movable deflection roller and one second non-movable deflection roller, as well as a second movable deflection roller, which is installed with the first movable deflection roller on a carriage, whereby the second movable deflection roller is disposed along the deflection belt between the first non-movable deflection roller and the second non-movable deflection roller and deflects the deflection belt and whereby the angular rotation between the first toothed belt wheel and the second toothed belt wheel is achievable through a translational movement of the carriage.

With such a mechanism it is possible, with a purely translational movement of the carriage, to bring about the angular rotation between the first toothed belt wheel and the second toothed belt wheel and thereby to change the position of the tools in relation to the rotational axis of the apparatus. This mechanism has furthermore the advantage that the deflection belt is always kept under the same tension irrespective of the position of the first movable deflection roller. This makes possible a precise advance of the tools and prevents the deflection belt from being damaged owing to too high a tension.

In a further preferred embodiment of the present invention, the apparatus comprises a second motor, with which the position change of the deflection roller is drivable, whereby the angular rotation between the first toothed belt wheel and the second toothed belt wheel is achievable. The position change can thereby take place quickly, precisely and in a reproducible way. If the second motor is controlled by computer, this can take place automatically and at high speed.

In another preferred embodiment of the present invention, the apparatus comprises a planetary gearing with annulus gear, planetary wheels and sun wheel, whereby the circling of the planetary wheels about the sun wheel is drivable through the rotation of the fourth toothed belt wheel, whereby through the circling of the planetary wheels about the sun wheel a shaft is drivable, which is connected to the third toothed belt wheel, whereby the sun wheel is installed in a way rotatable about a common rotational axis of the third toothed belt wheel and of the fourth toothed belt wheel and whereby the angular rotation between the first toothed belt wheel and the second toothed belt wheel is achievable through a rotation of the sun wheel.

With this mechanism, the angular rotation between the first toothed belt wheel and the second toothed belt wheel and accordingly the setting of the position of the tools can be brought about by a turning movement. A turning of the sun wheel can thereby be "translated" into an angular rotation between the first toothed belt wheel and the second toothed belt wheel, superimposed on the common rotation of the first toothed belt wheel and of the second toothed belt wheel. This translation of the angular rotation is independent of the rotational speed of the first toothed belt wheel and of the second toothed belt wheel. It makes possible an especially simple and precise advance of the blades.

In a further preferred embodiment of the present invention, the apparatus comprises a second motor, with which the rotation of the sun wheel is drivable, through which the angular rotation between the first toothed belt wheel and the second toothed belt wheel is facilitated. With the second motor, the position change can be carried out in a reproducible, quick and precise way. If the motor is controlled by a computer, this can take place in a fully automated way.

In another preferred embodiment of the present invention, the apparatus comprises a third toothed belt wheel and a fifth toothed belt wheel, which are drivable by means of the drive means, the first toothed belt wheel being drivable by the third toothed belt wheel via a first toothed belt and the second toothed belt wheel being drivable by the fifth toothed belt wheel via a second toothed belt, and moreover a planetary gearing with planetary wheels, and a sun wheel connected and drivable with the fifth toothed belt wheel, whereby the planetary gearing is disposed inside a hollow body with inner toothing, whereby through the circling of the planetary wheels around the sun wheel a shaft is drivable which is connected to the planetary wheels and to the third toothed belt wheel, and whereby the angular rotation between the first toothed belt wheel and the second toothed belt wheel is achievable through a rotation of the hollow body.

With this embodiment the angular rotation between the first toothed belt wheel and the second toothed belt wheel and accordingly the setting of the position of the tools can be brought about by a turning movement of the hollow body. It makes possible an especially simple and precise advance of the blades.

In another preferred embodiment of the present invention, the tools are disposed evenly on the tool flange. This ensures a precise cutting, centering or holding of a cable.

In a further preferred embodiment of the present invention, the tools are installed on the tool flange in a way swivel mounted about pivot pins. The tool flange can thereby be constructed compactly and the positioning means with which the tools are advanced can take the form of simple positioning pins.

In a further preferred embodiment of the present invention, the tools are installed on the tool flange in a radially displaceable way. The setting means can thereby take the form of a spiral flange.

In another preferred embodiment of the present invention, the angular rotation between the first toothed belt wheel and the second toothed belt wheel is controllable with electronic means. The advance of the blades can thereby take place in a completely automated way.

In another preferred embodiment of the present invention, the tools are blades. A cable can thereby be processed quickly and precisely, e.g. can be stripped.

In another preferred embodiment of the present invention, the apparatus comprises detection means, with which a contact between blades and the electrical conductor of the cable to be processed is detectable. It can thereby be detected whether the blades touch the electrical conductor of the cable. Thus it can be ensured that the blades do not "injure" the electrical conductor. With such contact detection, the incision depth for subsequent processing can be continuously adapted with statistical methods in an optional way, or the cutting regime intervenes quickly enough, based on contact detection, in the current incision step before damage to the conductor arises.

The contact detection can also be used to determine the optimal production incision and removal diameter before production, using test incisions until blade-conductor contact, with statistical methods.

Moreover the detection means can be used for control of the incision position or removal length, in that with initially closed blades the cable is brought by hand or automatically up to contact with the blades, whereupon the cable holder closes, the blades open and the cable holder brings the cable into processing position.

PREFERRED EMBODIMENTS OF THE INVENTION

Figure 1A:
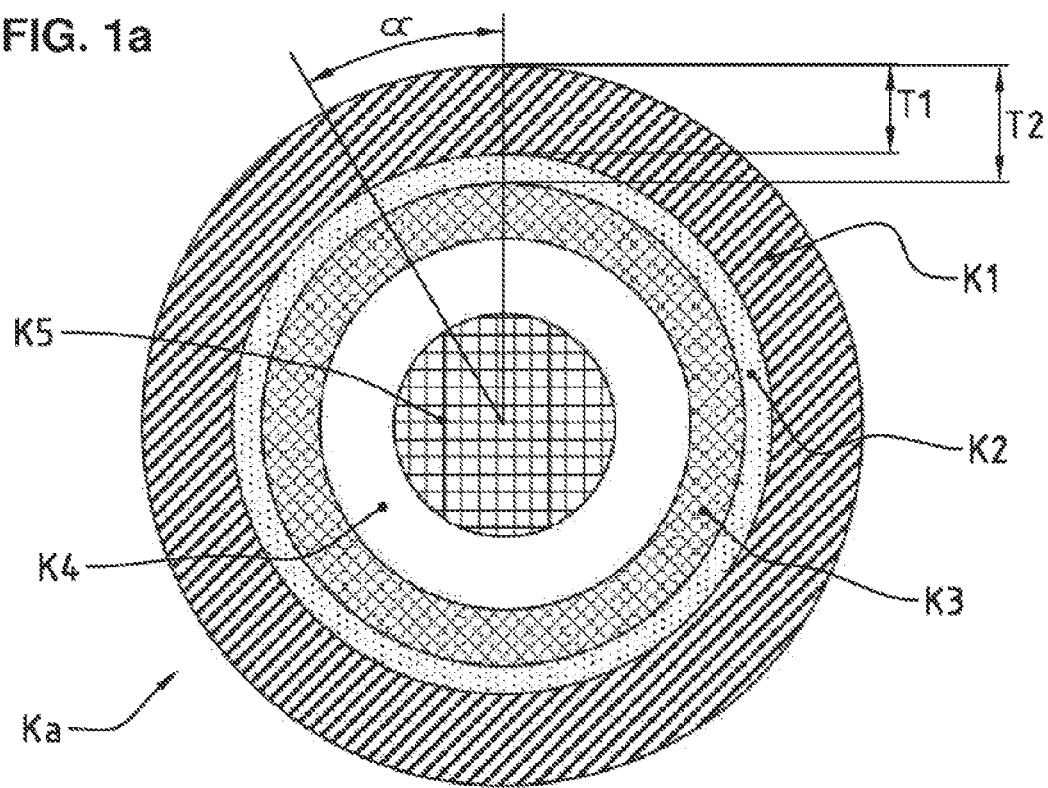
FIG. 1a shows a schematic cross-sectional view of an electrical cable known from the state of the art which has a shielding foil to be removed.

FIG. 1a shows in an exemplary way a sectional view of an electrical cable Ka known from the state of the art comprising a shielding foil K2 to be removed. Besides the shielding foil K2, the cable Ka has in addition an insulating sheath K1, a shielding braid K3, a dielectric K4 and an inner conductor K5. The depth T1 corresponds approximately to the thickness of the insulating sheath K1, the depth T2 to that of the insulating sheath K1 and at least half of the shielding foil K2.

Figure 1B:
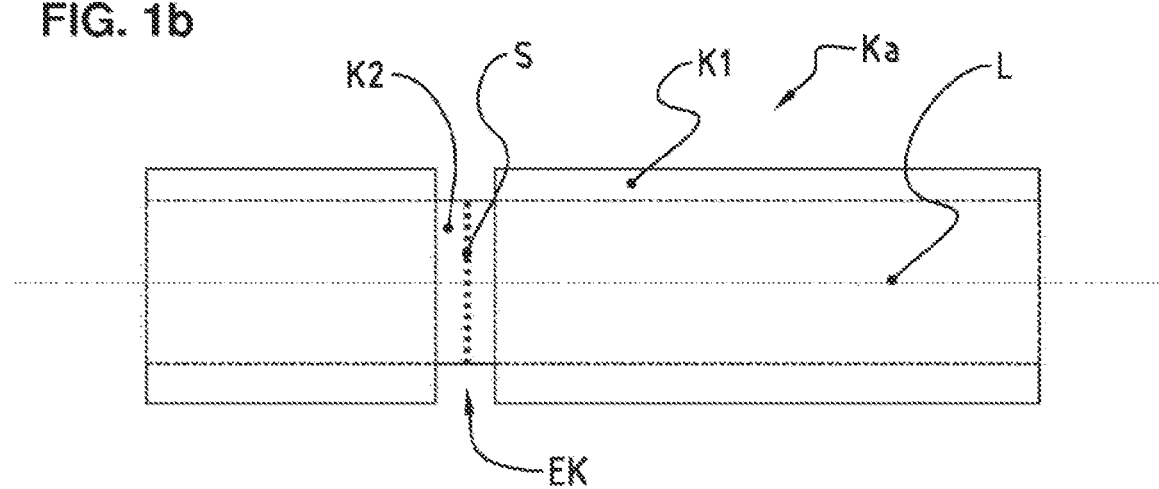
FIG. 1b shows a schematic side view of an electrical cable known from the state of the art in which a predetermined breaking point has been created in the shielding foil to be removed.

FIG. 1b shows a side view of a cable Ka with longitudinal axis L, in which an incision EK has been cut into the insulating sheath K1 and a predetermined breaking point S has been created in the shielding foil K2. How the predetermined breaking point S is created will be explained in the following and represents a partial aspect of the present invention.

Figure 2:
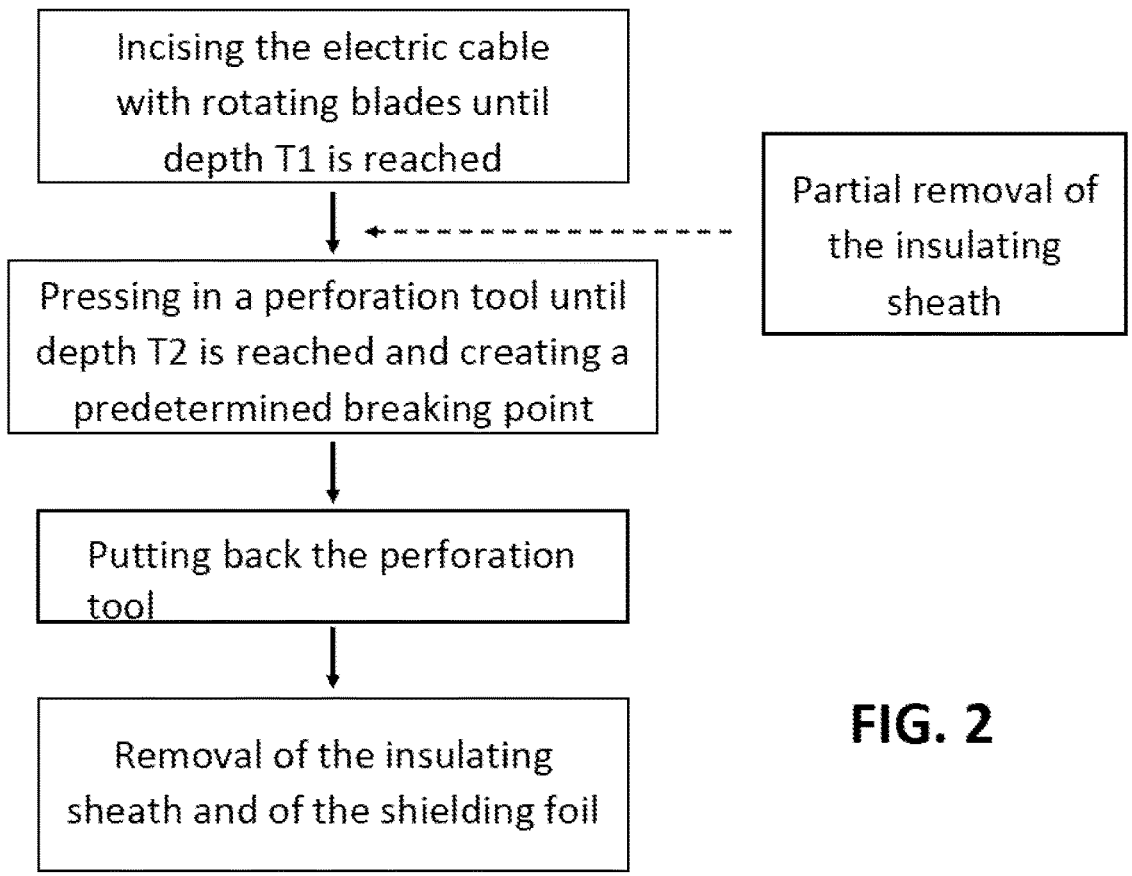
FIG. 2 shows a block diagram of a first preferred embodiment of the method according to the invention.

FIG. 2 shows a block diagram of a method for removing a shielding foil of an electrical cable according to a first embodiment of the present invention. The method begins with step a, with the cutting of an incision EK in the insulating sheath K1 of the electrical cable with the rotating blades of a rotary stripping machine until a depth T1 is reached. The aim of this first step is an incision EK in the insulating sheath K1 of the electrical cable Ka, without the shielding foil K2 being cut. A cutting into the thin shielding foil with rotating blade would usually also lead to injuries to the underlying layer. To ensure that the shielding foil is not cut in step a, the cutting with rotating blades is carried out to a depth T1 which is smaller than or the same as the thickness of the insulating sheath K1.

In a second method step b, a predetermined breaking point is created in the shielding foil K2 using a non-rotating perforation tool. To achieve this, the perforation tool is pressed into the incision EK until a depth T2 is reached that corresponds to the thickness of the insulating sheath and at least half of the thickness of the shielding foil. The pressing of the non-rotating perforation tool into the shielding foil suffices to create at least a predetermined breaking point S in the shielding foil K2. Preferably the perforation tool is a blade of the stripping apparatus used in step a. It is to be noted that in step b the blades of the stripping apparatus do not rotate. The perforation tool can however be another suitable tool, such as, for example, a needle. With a precise adjustment of the depth of the impression in step b, it can be ensured that the shielding braid K3 under the shielding foil K2 is not injured.

In step c the shielding foil K2 is torn at the predetermined breaking point S. In step d the shielding foil K2 is removed, preferably together with the insulating sheath K1. As is indicated in FIG. 2, a partial removal of the insulting sheath K1 can be carried out between steps a and b. Steps c and d can be carried out either manually or by means of a removal device (see FIGS. 13 to 15) provided for this purpose.

Figure 3:
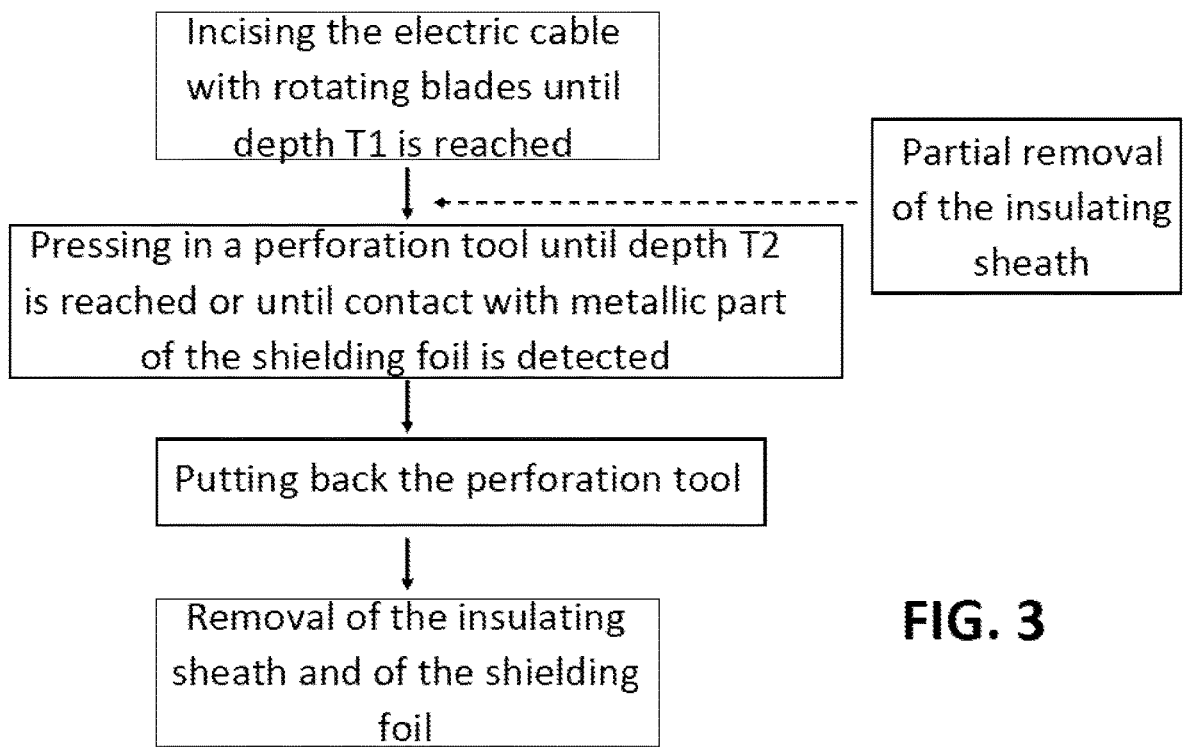
FIG. 3 shows a block diagram of a second preferred embodiment of the method according to the invention.

FIG. 3 shows a block diagram of a method for removing a shielding foil of an electrical cable according to a second embodiment of the present invention. Used for carrying out this method is preferably a rotary stripping apparatus comprising means for detection of a contact of the blades with a conductive object. The creation of a predetermined breaking point in the shielding foil can thereby be carried out by means of the continuous advance of the non-rotating blades of the stripping apparatus until the depth T2 is reached or until a contact of a blade with the shielding foil or with the shielding braid is detected. The possibility of detection of a contact of the blades with the shielding foil or with the shielding braid ensures that the shielding braid is not injured by the creation of the predetermined breaking point. In this embodiment a partial removal of the insulating sheath can also be foreseen between the first and the second step. It is also possible for the blades to be advanced further in the direction of the inner conductor after the detection of a contact with the shielding foil. It can thereby be ensured that a predetermined breaking point is created also in those regions where the shielding foil is overlapping.

Figure 4:
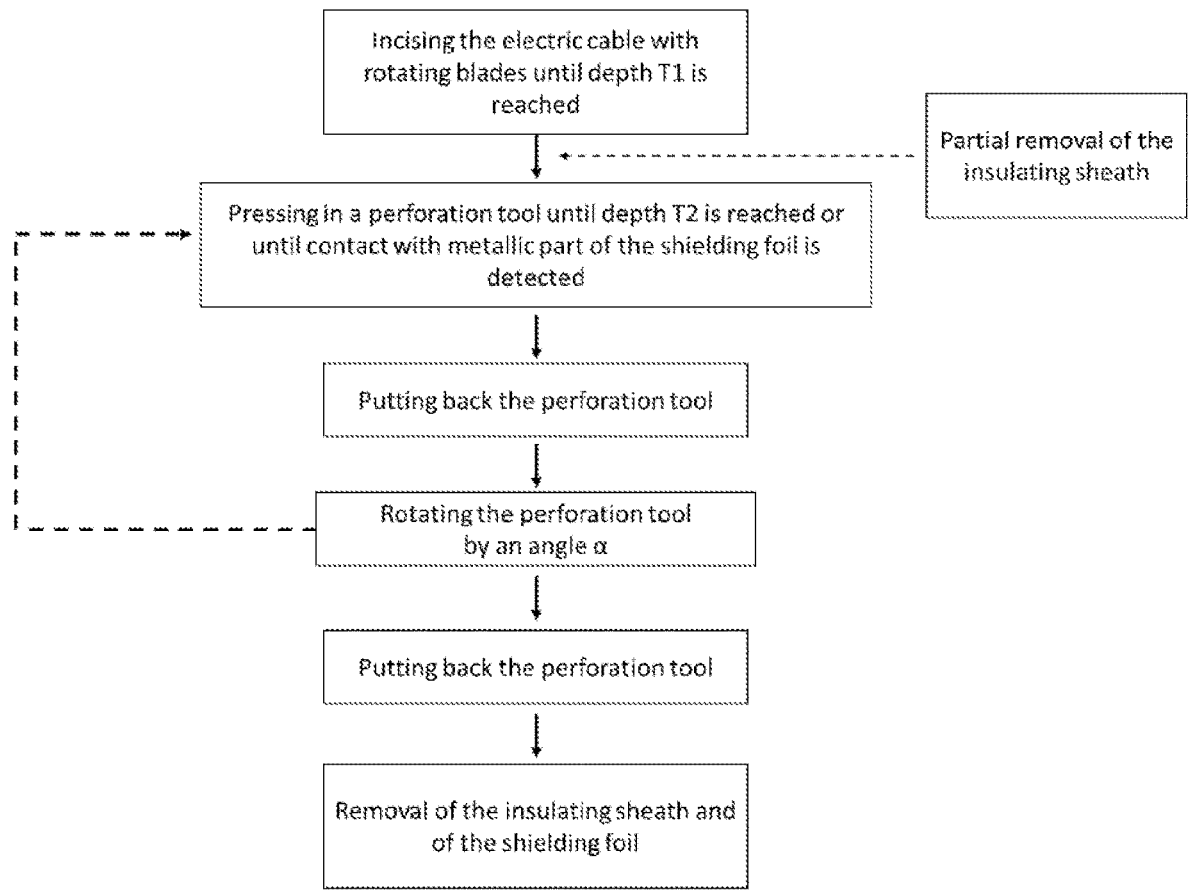
FIG. 4 shows a block diagram of a third preferred embodiment of the method according to the invention.

FIG. 4 shows a block diagram of a method for removing a shielding foil of an electrical cable according to a third embodiment of the present invention. In this method, after a predetermined breaking point has been created in the shielding foil with a predetermined angular position of the blades of the stripping apparatus, the blades are put back so that they no longer touch the shielding foil, and are turned by an angle α. In this new angular position the blades are then pressed into the shielding foil again. Several such adjustments of the angular position of the tools with subsequent pressing in of the shielding foil can be foreseen. After the shielding foil has been pressed in at least twice, the sheath and the shielding foil are removed. Through the pressing in of the shielding foil using the blades in different angular positions it can be ensured that a predetermined breaking point is created along the entire circumference of the cable. Also in this third embodiment, after the rotary incision of the insulating sheath, a partial or a complete removal can be carried out.

Figure 5:
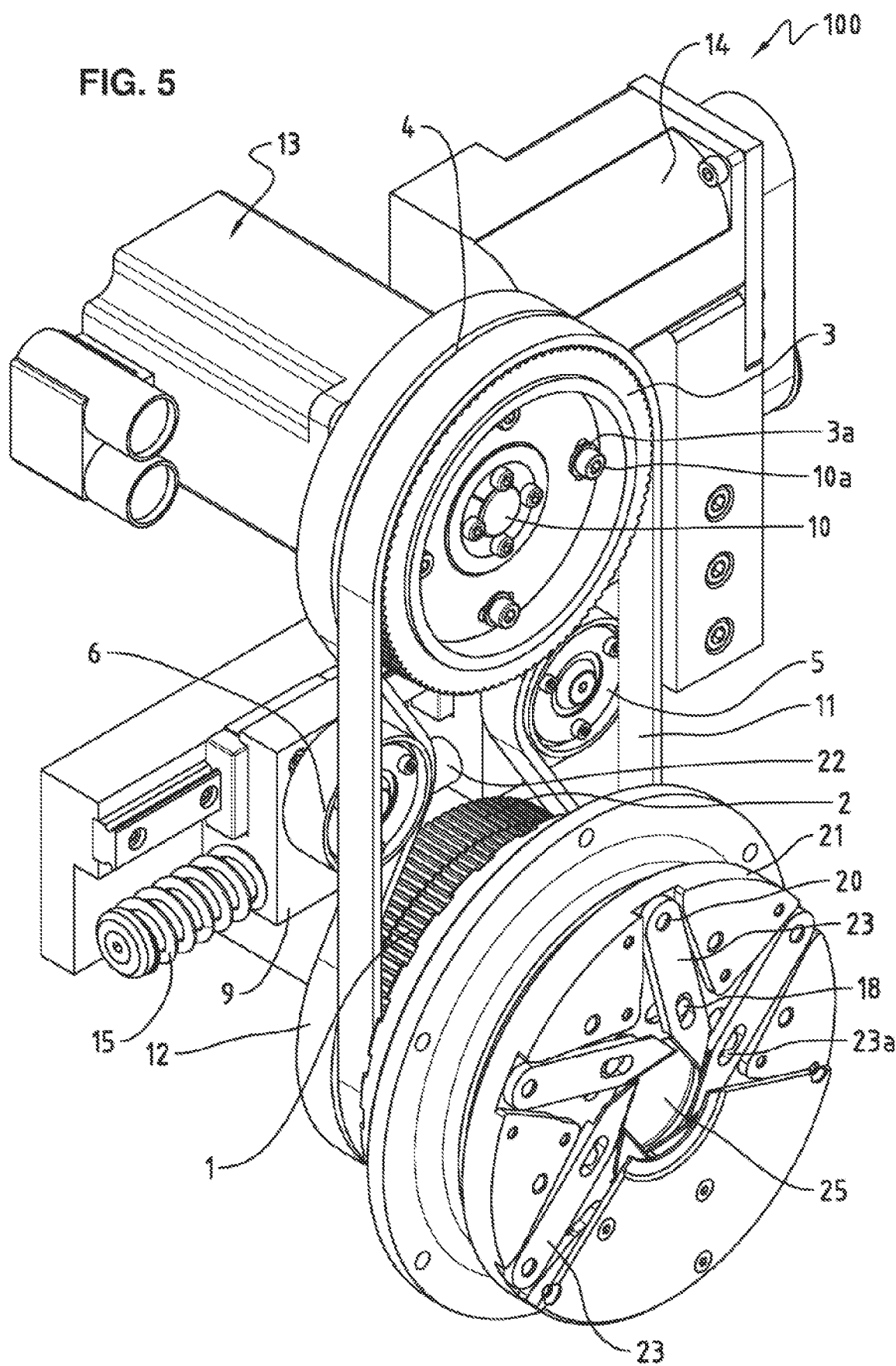
FIG. 5 shows a perspective view of a first embodiment of a device according to the invention.
Figure 6:
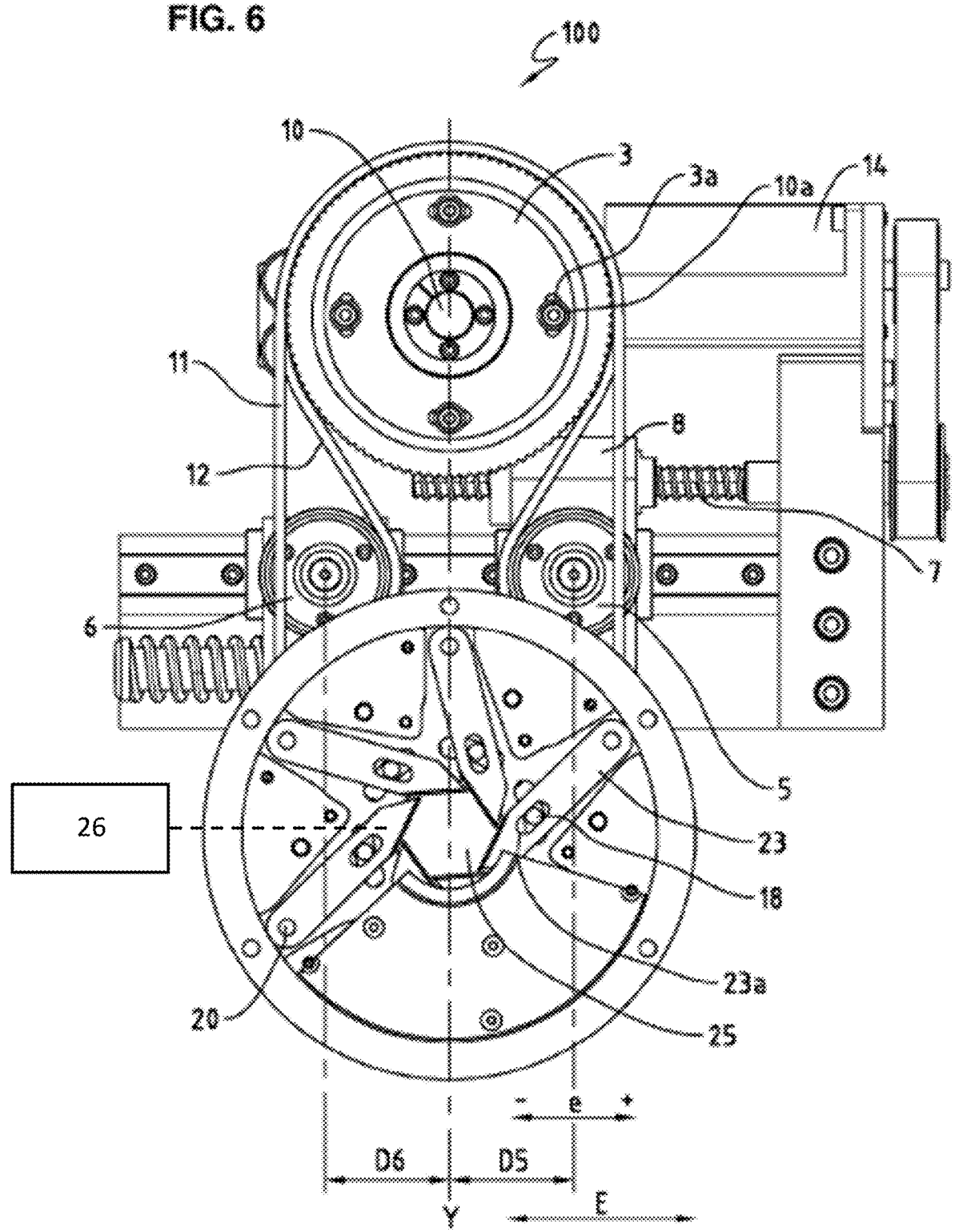
FIG. 6 shows a front view of a first embodiment of a device according to the invention.

FIG. 5 shows a perspective view and FIG. 6 a front view of a first embodiment of a device according to the invention 100 for supporting the removal of a shielding foil of an electrical cable. In this embodiment, a third toothed belt wheel 3 and a fourth toothed belt wheel 4 are driven with the same drive shaft 10 by a common drive means, here by a first motor 13. Toothed belt wheels 3 and 4 are screwed by means of screws 10a and therefore turn synchronously. Toothed belt wheel 3 has slotted holes 3a, which can be used for a relative angular rotation of the toothed belt wheels 3 and 4 to adjust the knife opening.

The third toothed belt wheel 3 drives via a first toothed belt 11 a first toothed belt wheel 1, and the fourth toothed belt wheel 4 drives via a second toothed belt 12 a second toothed belt wheel 2. The first toothed belt wheel 1 and the second toothed belt wheel 2 thus turn coaxially and synchronously. The first toothed belt wheel 1 and the second toothed belt wheel 2 are however rotatably mounted in an angularly adjustable way with respect to one another. The first toothed belt wheel 1 and the second toothed belt wheel 2 define an opening A, through which a cable with a shielding foil to be removed can be led or passed.

Figure 7:
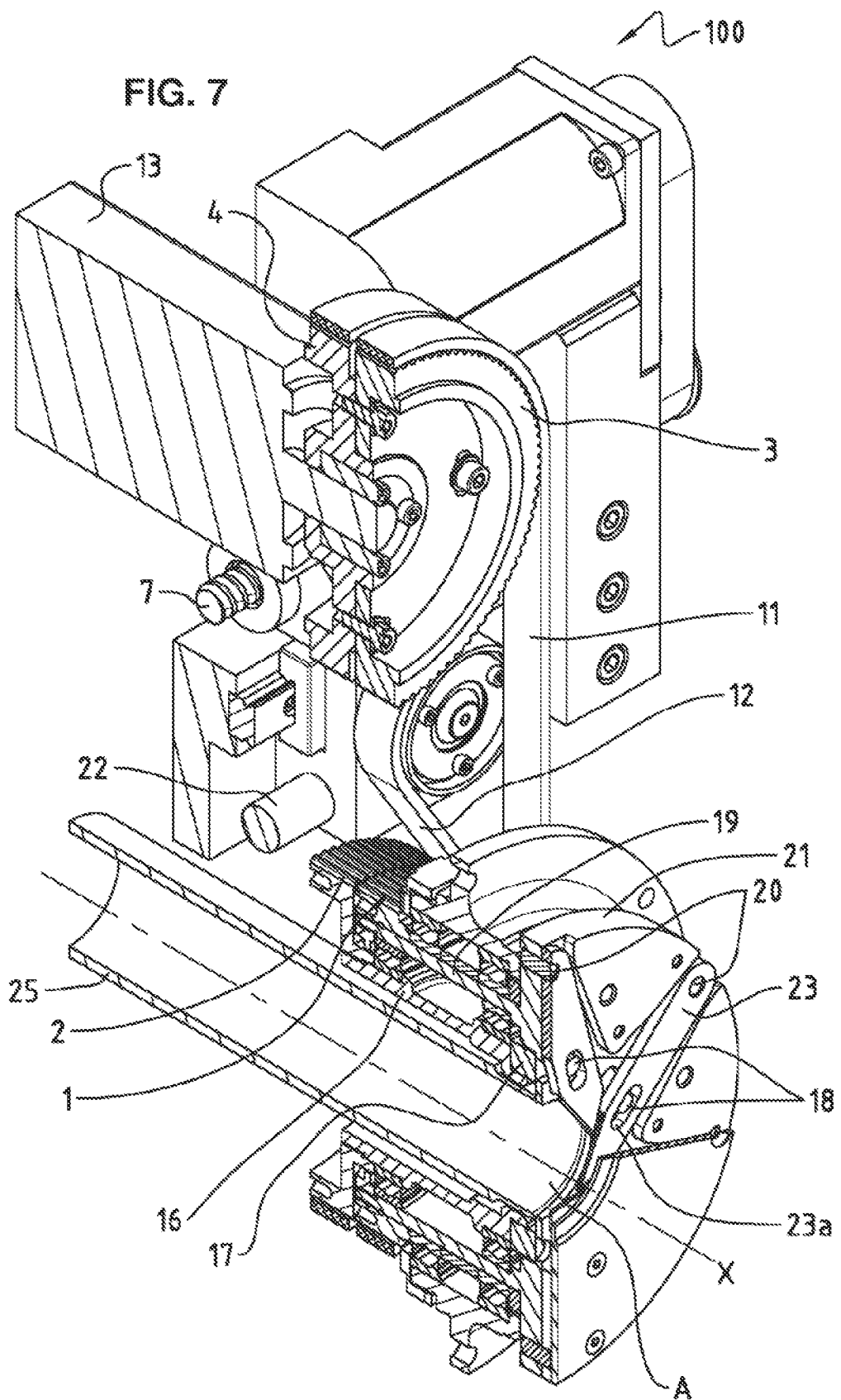
FIG. 7 shows a perspective sectional view of a first embodiment of a device according to the invention.

With reference to FIG. 7, it can be seen that the second toothed belt wheel 2 is connected to positioning pins 18 via a bearing sleeve 16 and via an adjusting ring 17. The first toothed belt wheel 1 is connected via a rotor 19 to the pivot pins 20. Connected to the rotor 19 is also a tool flange 21, here a knife flange, on which tools 23 are installed, here they are blades, in a way pivotable about the pivot pins 20. The positioning pins 18 are disposed in such a way that they engage in the blade openings 23a and thus allow the blades 23 to pivot about the pivot pins 20. Via the angular rotation between the first toothed belt wheel 1 and the second toothed belt wheel 2 a desired knife-pivot-angle $\lambda$ and cutting diameter Df can thus be set.

As is seen in FIGS. 5 to 7, the second toothed belt 12 is waisted by a deflection roller 5 and a tensioning roller 6. In this embodiment, the deflection roller 5 can be shifted by a second motor 14 via spindle 7 and via a first carriage 8 in a translational way. A second carriage 9 is connected to the first carriage 8 via spring bolts 22 and spring 15.

As shown in FIG. 6, the symmetry position of the device 100 is defined as the position in which the distance D5 of the deflection roller 5 to the axis of symmetry Y is the same as the distance D6 of the tensioning roller 6 to the axis of symmetry Y. Through loosening of the screws 10a and turning of the fourth toothed belt wheel 4 relative to the third toothed belt wheel 3, a turning of the first toothed belt wheel 1 relative to the second toothed belt wheel 2 can be brought about without a displacement of the deflection roller 5 being necessary. The positioning pins 18 thereby rotate about the rotational axis X and pivot the blades 23. The position of the blades 23 can thereby be set in the symmetry position in a simple way.

Figure 8A:
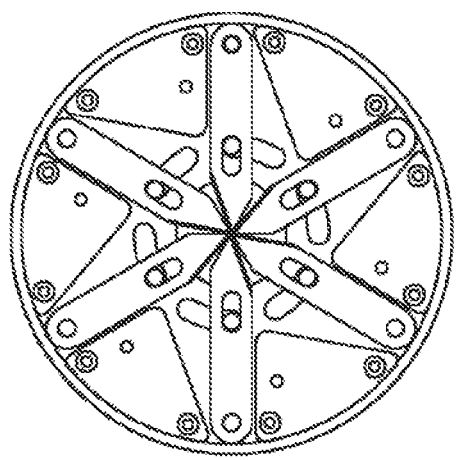
FIG. 8a shows the knife flange with the blades in completely closed position.

FIG. 8a shows the blades in the position with the smallest cutting diameter Df.

Figure 8B:
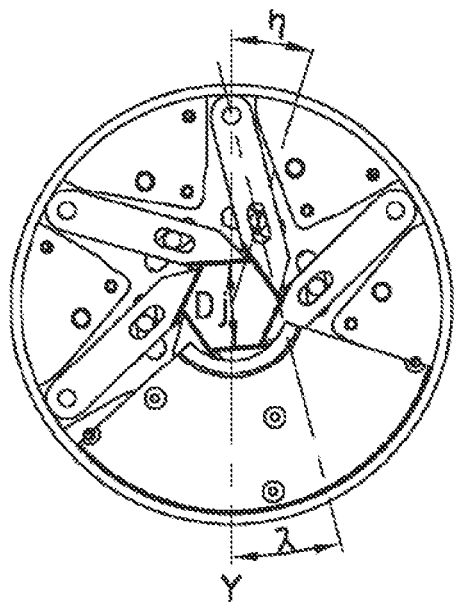
FIG. 8b shows the knife flange with the blades in a middle position.

FIG. 8b shows the blades in adjustment position, which is achieved in that, in the symmetry position, through loosening of the screws 10a and turning of the fourth toothed belt wheel 4 relative to the third toothed belt wheel 3, the turning of the second toothed belt wheel 2 relative to the first toothed belt wheel 1 is brought about and thus the closing of the blades to an adjustment-cutting-diameter Dj. In this position, the positioning pins 18 are turned with respect to the axis of symmetry Y by a so-called adjusting ring-adjustment-angle $\eta$, which subsequently serves as the basis for the geometric relationship of cutting diameter Df and deflection roller displacement e.

Figure 8C:
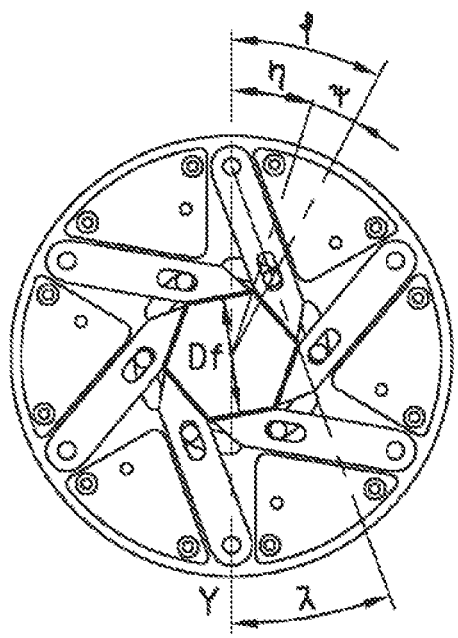
FIG. 8c shows the knife flange with the blades in completely open position.

If now, in accordance with FIG. 6, the first carriage 8 with the deflection roller 5 is shifted from the symmetry position to the right and along direction E, the second carriage 9 with the tensioning roller 6 is also shifted to the right via the spring bolts 22 and spring 15, so that the tensioning roller 6 is pressed on the second toothed belt 12. The horizontal displacement e of the deflection roller 5 to the right in relation to the symmetry position brings about a turning of the second toothed belt wheel 2 relative to the first toothed belt wheel 1. Since the adjusting ring and the positioning pins 18 are connected to the second toothed belt wheel 2, the positioning pins 18 are turned by a so-called adjusting ring-rotation-angle $\psi$ with respect to the tool flange and the pivot pins. As shown in FIG. 8c, this adjusting ring-rotation-angle $\psi$ added to the adjusting ring-adjustment-angle $\eta$ adds up to the adjusting ring-total-angle $\varphi$. The blades 23 are pivoted by the positioning pins 18 and from this adjusting ring-total-angle $\varphi$ there results a cutting diameter Df. It is important to note that the adjusting ring-rotation-angle $\psi$ is independent from the rotational speed of the toothed belt wheels 1, 2 and that the toothed belt wheels 1 and 2 again turn synchronously, as soon as the cutting diameter Df has been set. Hence the setting of the adjusting ring-rotation-angle $\psi$ represents only a phase shift between the first toothed belt wheel 1 and the second toothed belt wheel 2 with respect to the adjusting ring-adjustment-angle $\eta$.

The exact mathematical correlation between the amount e of the horizontal shift of the deflection roller 5 and the cutting diameter Df will not be derived here. One skilled in the art would be able to derive this correlation without any difficulty through trigonometric considerations. It is only pointed out here that, for the cutting diameter Df, it is possible to derive the correlation between e and Df.

It is important to note that the setting of the cutting diameter Df can take place with rotating or non-rotating blades. With the device 100 it is thus possible to carry out precisely the above-described embodiment of the method according to the invention and to create a predetermined breaking point in a shielding foil. Furthermore the device 100 can comprise means for detection 26 of the contact of the tools 23 with a conductive object, such as, for example, the metallic part of the shielding foil or the shielding braid. A predetermined breaking point can thereby be created even more precisely and it can be ensured that the shielding braid is not injured.

Figure 9:
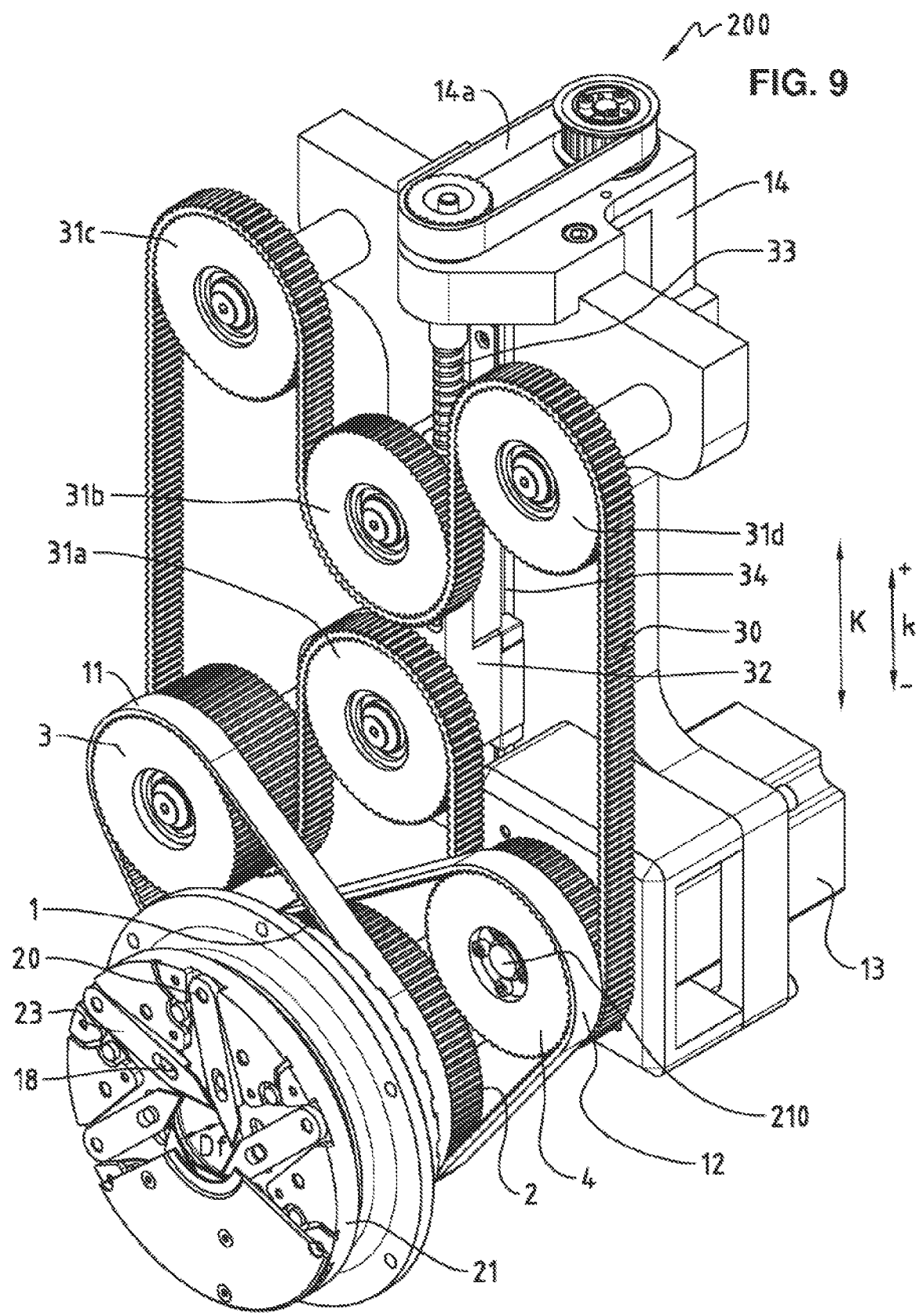
FIG. 9 shows a perspective view of a second embodiment of a device according to the invention.

FIG. 9 shows a second preferred embodiment of a device 200 for supporting the removal of a shielding foil of an electrical cable according to the invention. Components which carry out the same function as in the first embodiment are designated here with the same reference numerals. Unlike in device 100, the toothed belt wheels 3 and 4 are not coaxially arranged. They are however drivable synchronously with the deflection belt 30 by the same first motor 13, which allows the shaft 210 to rotate. As in the device 100, the third toothed belt wheel 3, via a first toothed belt 11, drives a first toothed belt wheel 1, and the fourth toothed belt wheel 4 drives, via a second toothed belt 12, a second toothed belt wheel 2. The first toothed belt wheel 1 and das second toothed belt wheel 2 thus turn synchronously. The toothed belt wheels 1, 2 are however rotatably mounted in an angularly adjustable way with respect to one another in this embodiment too.

The deflection belt 30 is deflected with the non-movable deflection rollers 31c, 31d, whereby the movable deflection rollers 31a and 31b are installed on a carriage 32, which is movable in direction K by means of spindle 33 and track 34 movable. The spindle 33 is driven by the second motor 14 and motor belt 14a. Thanks to this mechanism, the distance between the axes of the movable deflection rollers 31a, 31b can be adjusted to the axes of the non-movable deflection rollers 31c, 31d and to the axes of the third and fourth toothed belt wheels 3, 4.

Figure 10:
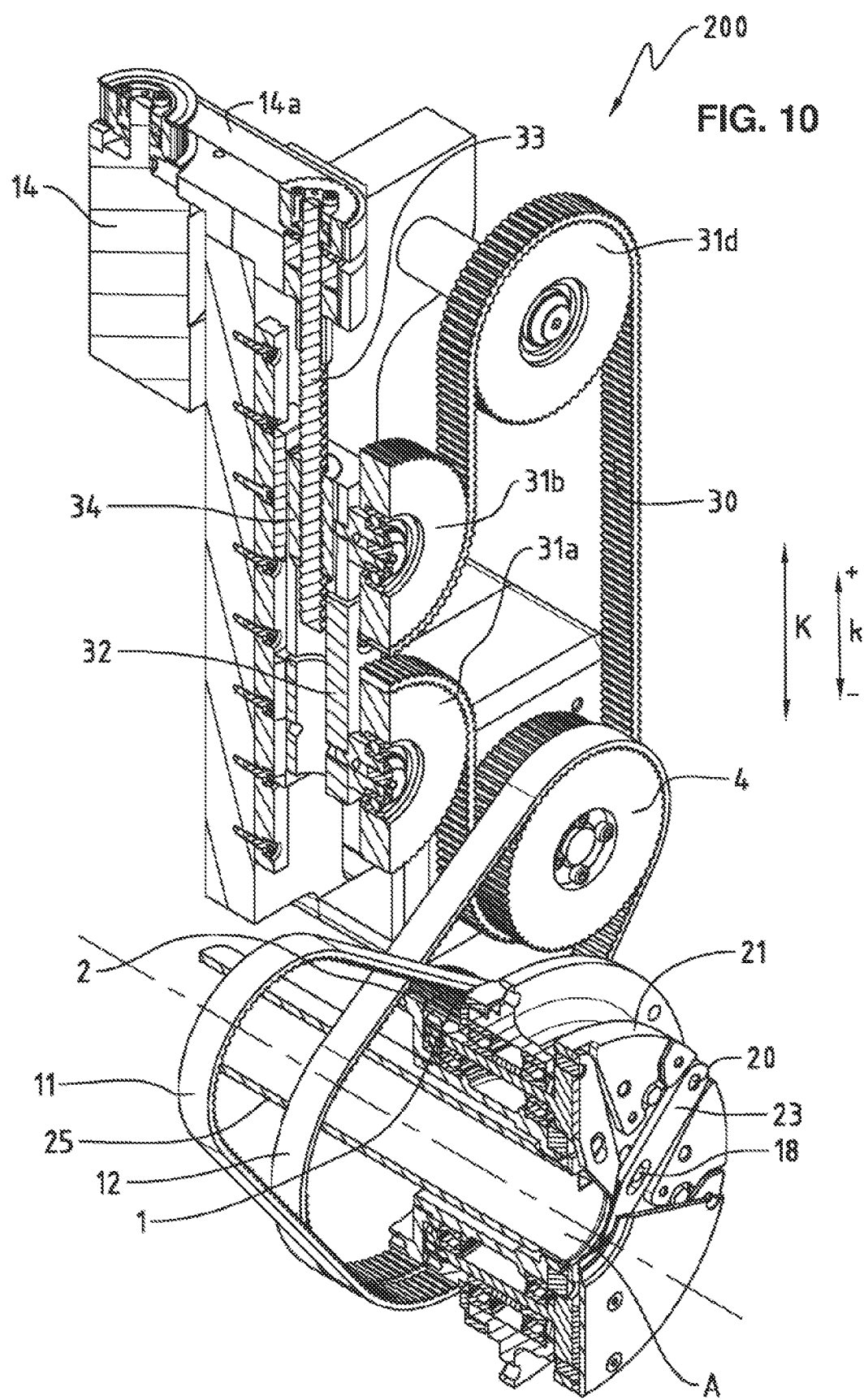
FIG. 10 shows a perspective sectional view of a second embodiment of a device according to the invention.

As is easy to understand from FIG. 9, a shift k of the movable deflection rollers 31a and 31b in direction K with respect to the adjustment position brings about a turning of the first toothed belt wheel 1 relative to the second toothed belt wheel 2. Since the positioning pins 18 (exactly as can be seen in the device 100 and as in FIG. 10) are connected to the second toothed belt wheel 2, the positioning pins 18 are turned in a way corresponding to the displacement k by the so-called adjusting ring-rotation-angle $\psi$. This adjusting ring-rotation-angle $\psi$ with the adjusting ring-adjustment-angle $\eta$ adds up to the adjusting ring-total-angle $\varphi$, as shown in FIG. 8c. The blades 23 are shifted by the positioning pins 18, and from this adjusting ring-total-angle $\varphi$ there results a cutting diameter Df. It is important to note that the rotation angle $\psi$ here too is independent of the rotational speed of the toothed belt wheels and that the toothed belt wheels 1 and 2 again turn synchronously, as soon as the cutting diameter Df has been set. Hence the setting of the adjusting ring-rotation-angle $\psi$ merely represents a phase shift between the toothed belt wheels 1, 2 with respect to the adjusting ring-adjustment-angle $\eta$.

Unlike in the device 100, the adjusting ring-adjustment-angle $\eta$ is set with the position of the carriage 32. Around this adjustment position the carriage is then shifted along the direction K, in order to set the cutting diameter Df via the adjusting ring-rotation-angle $\psi$. A further difference between device 100 and device 200 consists in the mathematical relationship between the displacement e of the deflection roller 5 or the shift k of the movable deflection rollers 31a, 31b and the adjusting ring-rotation-angle $\psi$. While in the case of device 100 there exists a non-linear relationship between deflection roller shift e and adjusting ring-rotation-angle $\psi$, there results in the case of the device 200 a purely linear connection between the deflection roller shift k and the adjusting ring-rotation-angle $\psi$.

If one of the deflection rollers 31a, 31b is designed as tensioning roller, that is preferably 31b, since the deflection roller driven in a translatory way should be placed as close as possible to the third toothed belt wheel 3 and the fourth toothed belt wheel 4 in order to minimize cutting diameter errors through stretching of the deflection belt. Preferably the sections of the deflection belt 30 between third toothed belt wheel 3 and movable deflection roller 31a as well as fourth toothed belt wheel 4 and movable deflection roller 31a run parallel to one another.

The exact mathematical relationship between k and the adjusting ring-rotation-angle $\psi$, will not be derived here. One skilled in the art could derive this correlation without any difficulty through trigonometric considerations. Exactly as in the case of device 100, it is possible in the case of device 200 to derive the correlation between k and Df.

It is important to note that the deflection rollers 31b, 31c and 31d can be positioned differently than is shown in FIG. 9 without the functioning of the device 200 being affected. But it is essential that these rollers assume the function of a length compensation mechanism. When the movable deflection roller 31a is moved, one or more of the deflection rollers 31b, 31c and 31d must be correspondingly shifted so that the tension of the deflection belt 30 is preserved. In particular it must be ensured that the movement of the movable deflection roller 31a does not lead to the deflection belt 30 being torn.

It is important to note that here too the setting of the cutting diameter Df can take place with rotating or non-rotating blades. Thus, with the device 200, it is also possible to carry out precisely the above-described embodiments of the method according to the invention and to create a predetermined breaking point in a shielding foil. Furthermore the device 200 can comprise means for detection of the contact of the tools with a conductive object (not shown here), such as, for example, the metallic part of the shielding foil or the shielding braid. A predetermined breaking point can thereby be created even more precisely and it can be ensured that the shielding braid is not injured.

Figure 11:
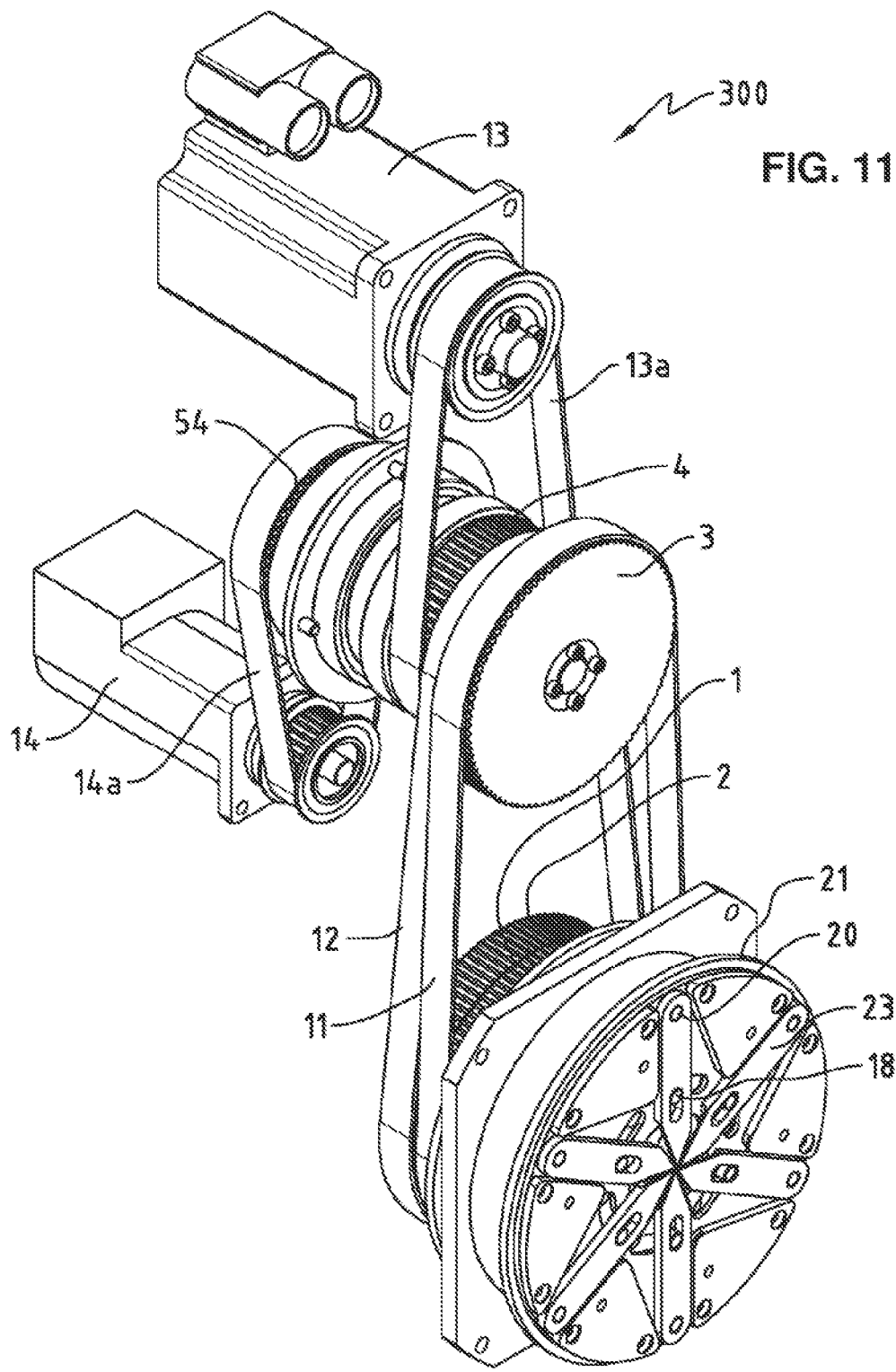
FIG. 11 shows a perspective view of a third embodiment of a device according to the invention.
Figure 12:
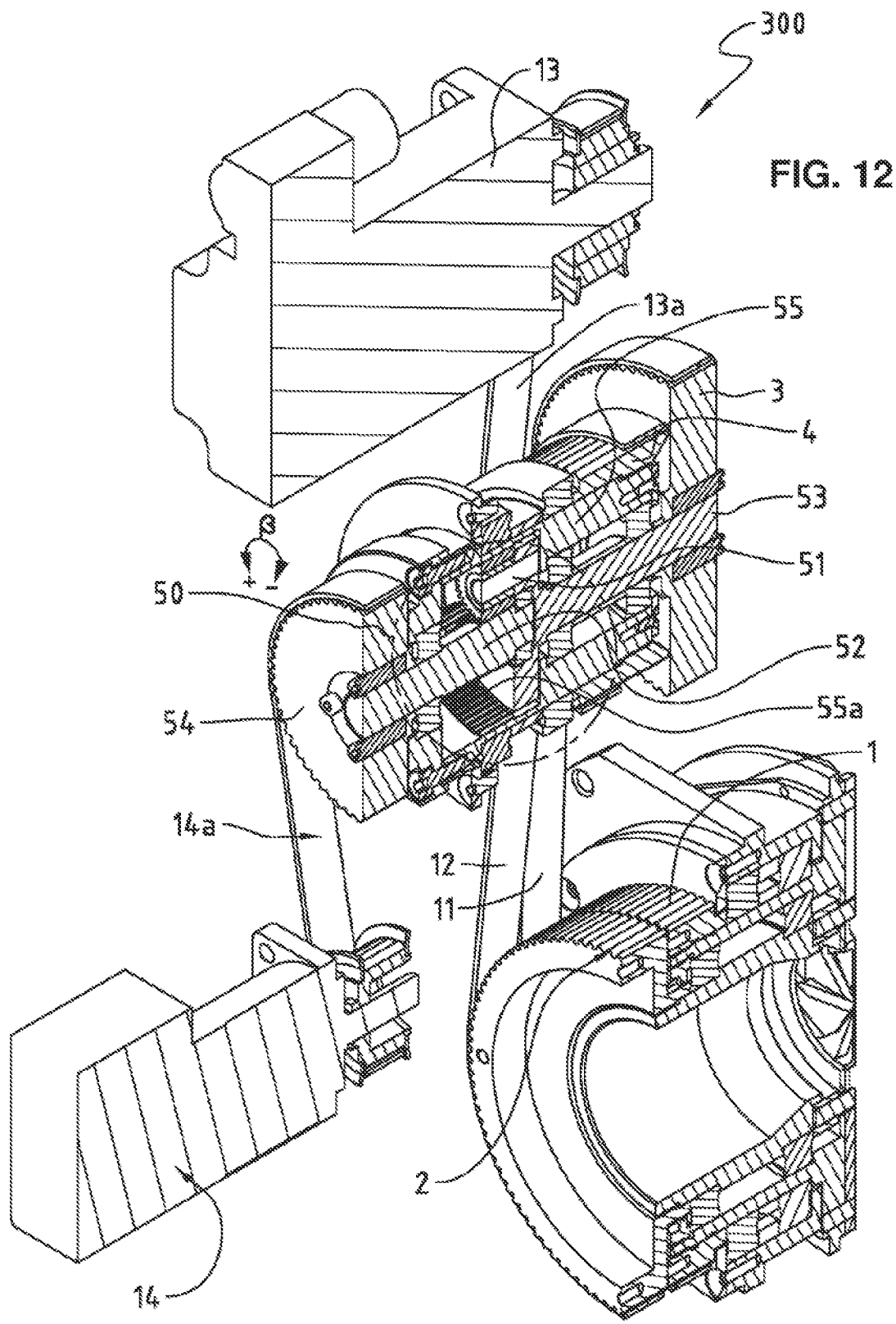
FIG. 12 shows a perspective sectional view of a third embodiment of a device according to the invention.

A third preferred embodiment of a device 300 according to the invention is shown in FIG. 11. In this embodiment, the angular rotation of the otherwise synchronously turning toothed belt wheels 1 and 2, and thereby the positions of the positioning pins 18 with respect to the pivot pins 20 and thus the cutting diameter Df is achieved with a planetary gearing 50. The mechanism for pivoting of the blades with positioning pins 18 is identical in this embodiment to that of the first and second embodiments. As can be seen in FIG. 12, a first motor 13 with a first motor drive belt 13a drives the fourth toothed belt wheel 4. The fourth toothed belt wheel 4 drives, for its part, the second toothed belt wheel 2, by means of the second toothed belt 12. The third toothed belt wheel 3 drives the first toothed belt wheel 1 by means of the first toothed belt 11.

As can be seen in FIG. 12, the fourth toothed belt wheel 4 is connected to a hollow body 55, which has an inner toothing 55a. Furthermore there exists inside the hollow body 55 and in connection with the inner toothing 55a a planetary gearing 50 with planetary wheels 51 and sun wheel 52. With the sun wheel 52 standing still, the planetary wheels 51 circle around the sun wheel 52 in the same rotational direction as the fourth toothed belt wheel 4 owing to the turning of the fourth toothed belt wheel 4 and of the hollow body 55 with its inner toothing 55a. The circling of the planetary wheels 51 drives a shaft 53, which is connected to the third toothed belt wheel 3. The number of teeth or respectively the diameter of the third toothed belt wheel 3 is selected in such a way that the first toothed belt wheel 1 and the second toothed belt wheel 2 turn synchronously with stationary sun wheel.

With the second motor 14, a fifth toothed belt wheel 54, which is connected to the sun wheel 52, can be driven via a second motor drive belt 14a. The turning of the fifth toothed belt wheel 54 by angle $\beta$ thus brings about the turning of the sun wheel 52. A turning of the sun wheel 52 in the same direction as the fourth toothed belt wheel 4 brings about a quicker circling of the planetary wheels 51 and thus a quicker turning of the shaft 53 and of the third toothed belt wheel 3. Since the third toothed belt wheel 3 drives the first toothed belt wheel 1, a turning of the toothed belt wheels 1, 2 and an adjusting ring-rotation-angle $\psi$ is consequently achieved with a turning of the sun wheel 52 by angle β. As in the previous preferred embodiments, the above-described mechanism brings about the phase shift y and the adjustment of the position of the blades 23. It is important to note that the adjusting ring-rotation-angle ψ is also here independent of the rotational speed of the toothed belt wheels 1, 2 and that the toothed belt wheels 1 and 2 again turn synchronously as soon as the second motor and the sun wheel stand still, and thereby a new cutting diameter Df is set. Hence the setting of the adjusting ring-rotation-angle ψ only represents a phase shift with respect to the adjustment position.

Once again the exact mathematical relationship between the angle of rotation P of the sun wheel 52 and the cutting diameter Df will not be derived here. One skilled in the art could derive this correlation without any difficulty through trigonometric considerations. It is only pointed out here that it is also possible here to derive the correlation between P and Df. Instead of driving the sun wheel 52 via the fifth toothed belt wheel 54, it could also be driven directly via a geared motor.

It is important to note that here too the setting of the cutting diameter Df can take place with rotating or non-rotating blades. Thus, with the device 300, it is also possible to carry out precisely the above-described embodiments of the method according to the invention and to create a predetermined breaking point in a shielding foil. Furthermore the device 300 can comprise means for detection of the contact of the tools with a conductive object (not shown here), such as, for example, the metallic part of the shielding foil or the shielding braid. A predetermined breaking point can thereby be created even more precisely and it can be ensured that the shielding braid is not injured.

One skilled in the art will easily understand that the blades 23 of the devices 100, 200 and 300 could easily be replaced by perforation needles. The perforation needles then would make possible a perforation of the shielding foil and thereby create a predetermined breaking point.

It is also to be noted that although in the embodiments presented here the distance of the blades 23 in relation to rotational axis X is set by means of a pivot mechanism, one skilled in the art could of course use other known closing or respectively opening mechanisms within the scope of the present invention. In particular one skilled in the art would recognize that a spiral flange could easily be used for this. A spiral flange would in particular facilitate the blades 23 being able to be displaced radially in relation to the rotational axis X.

Figure 13:
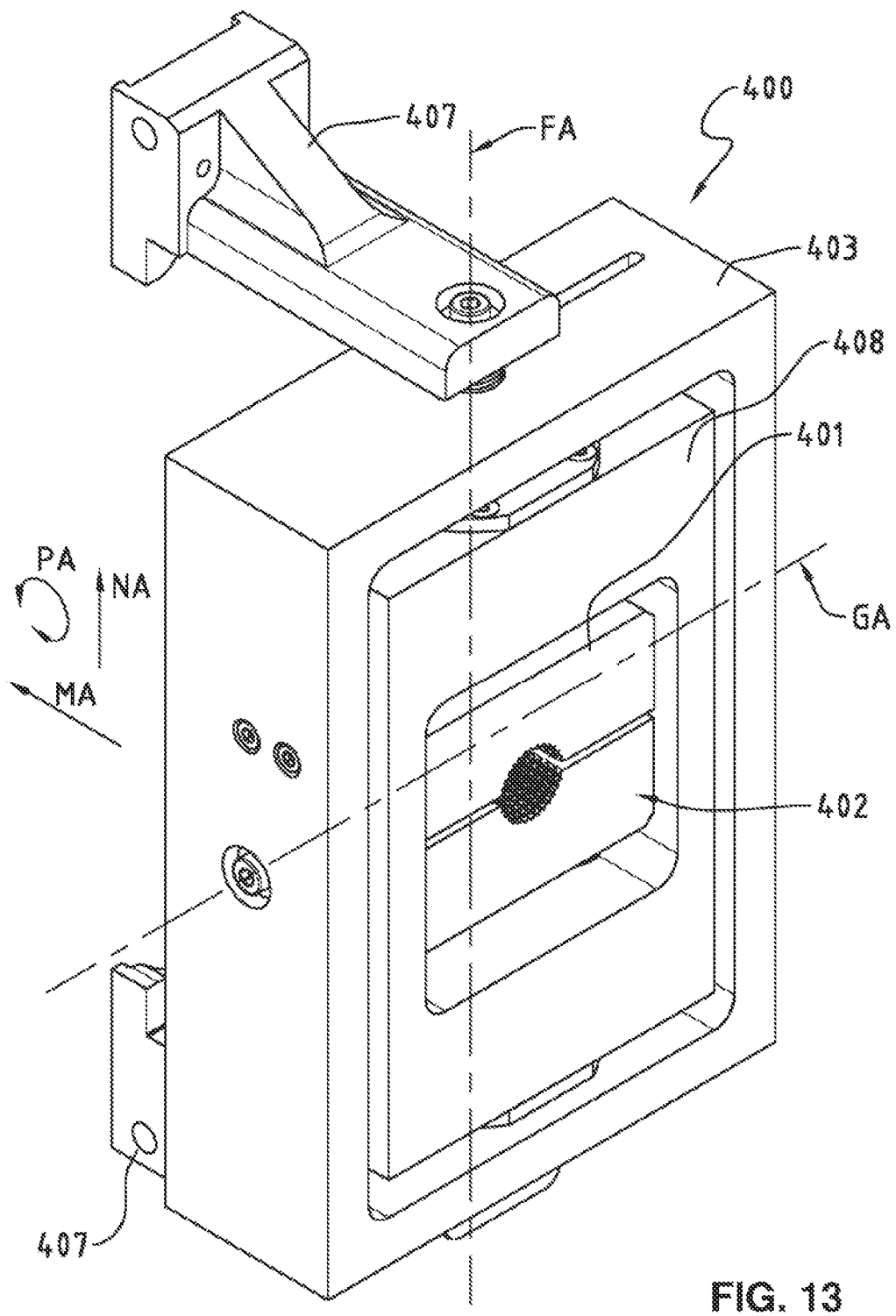
FIG. 13 shows a perspective view of a removal device for the pulling off of the shielding foil to be removed.

FIG. 13 show a removal device 400, which can be used for the tearing and removal of the shielding foil after a predetermined breaking point S has been created. The removal device 400 has a first clamping jaw 401 and a second clamping jaw 402 for clamping a cable. As can be seen from FIG. 13, the clamping jaws 401, 402 are mounted in a way rotating about the axes FA and GA. The clamping jaws 401, 402 are thereby installed on a gimbal or Cardan suspension. The removal device 400 also comprises feet 407 with which the first frame 403 of the gimbal suspension can be connected to means for translational and rotational movement (not shown here). The entire removal device 400 can thereby be shifted in a translational way along directions MA, NA and GA and rotated in rotational direction PA.

Figure 14:
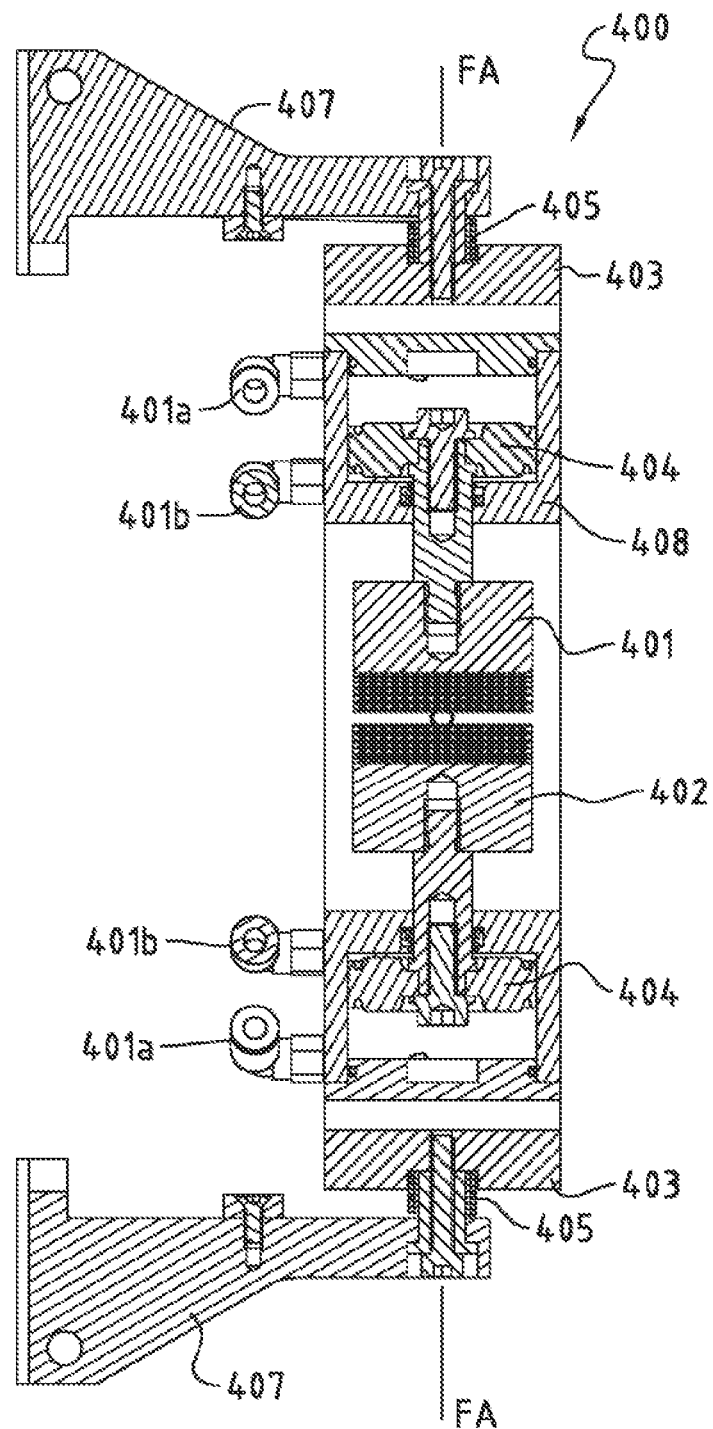
FIG. 14 shows a sectional view of a removal device for the pulling off of the shielding foil to be removed.

As is shown in FIG. 14, the clamping jaws 401, 402 are installed on the two pressure pistons 404. With the compressed air connections 401a, 401b, 402a, 402b compressed air can be admitted in order to adjust the position of the clamping jaws 401,402 along the axis FA. As can be seen from this figure, the clamping jaws 401 and 402 have separate compressed air connections 401a, 401b, 402a, 402b. The removal device also has torsion springs 405 about the axes GA and FA between the first frame 403 and the feet 407 and between the second frame 408 and the first frame 403. With the torsion springs 405 it is ensured that the first frame 403 and the second frame 408 in resting position, i.e. before the cable is clamped with the clamping jaws, are aligned perpendicular to the longitudinal axis L. The removal device could have a hydraulic drive instead of the compressed air drive. The clamping jaws in the gimbal suspension are preferably driven with a flow divider, for example a double piston actuator, or with a counter-rotating spindle. The clamping jaws are thereby always driven symmetrically with respect to the longitudinal axis.

Figure 15:
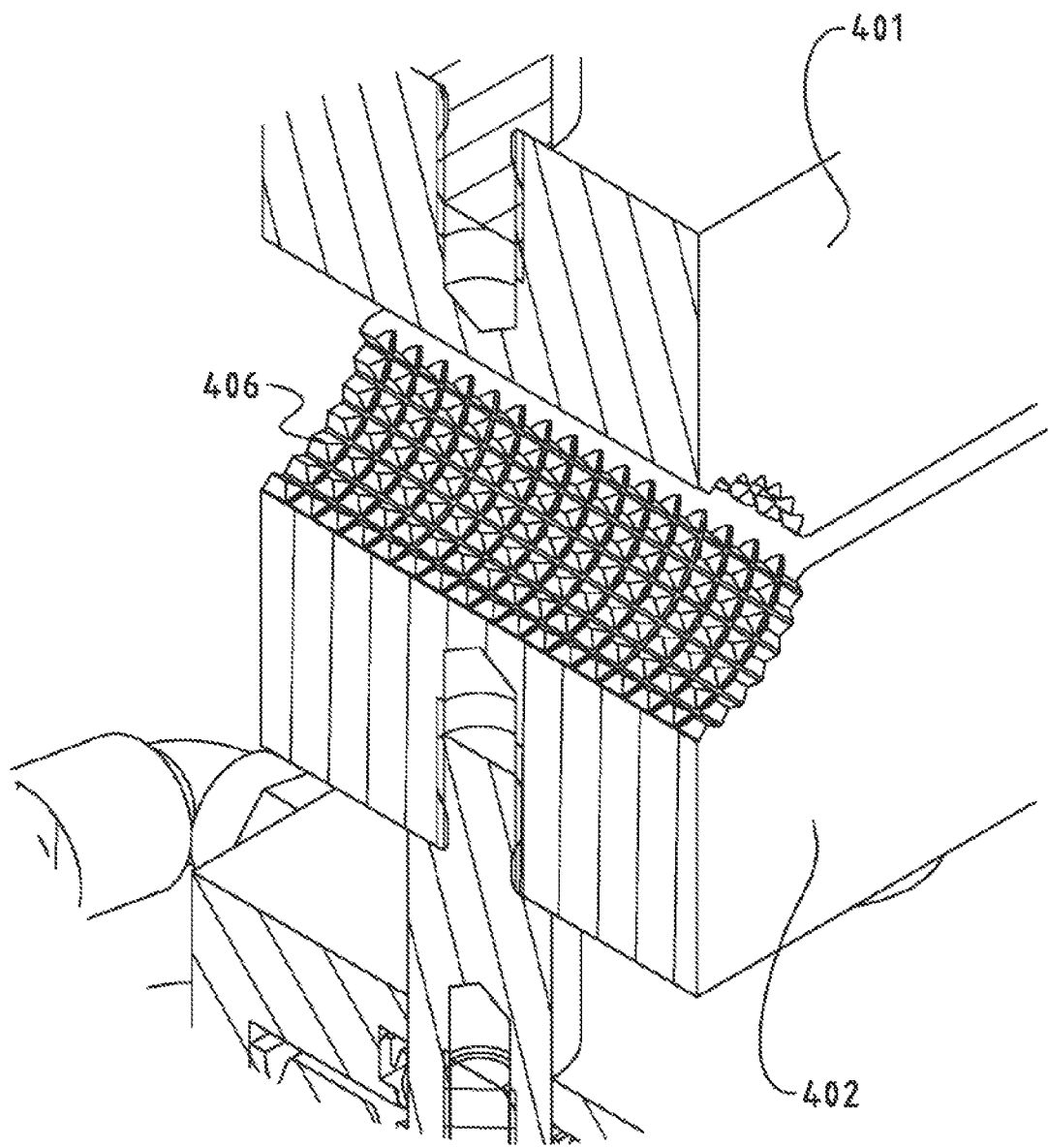
FIG. 15 shows a perspective sectional view of the clamping jaws of a removal device for the pulling off of the shielding foil to be removed.

FIG. 15 shows a detail view of the clamping jaws 401 and 402 of the removal device 400. The surfaces of the clamping jaws 401, 402 coming into contact with the cable have in this embodiment a structure increasing static friction. The cable can thereby be clamped better, so that the removal process takes place without the cable slipping.

Here it is to be noted that the invention is not limited to the described embodiments. It will be clear to one skilled in the art that further developments and modifications are absolutely possible within the scope of the protected invention. Device elements can be exchanged for other elements that fulfil the same or similar functions, as required. Additional devices and elements could likewise be provided. These and other measures and elements fall within the scope of the invention, which is defined by the claims.

LIST OF REFERENCE NUMERALS

1. First toothed belt wheel
2. Second toothed belt wheel
3. Third toothed belt wheel
4. Fourth toothed belt wheel
5. Deflection roller
6. Tensioning roller
7. Spindle
8. First carriage
9. Second carriage
10. Drive shaft
11. First toothed belt
12. Second toothed belt
13. Drive means, first motor
13a. First motor drive belt
14. Second motor
14a. Second motor drive belt
15. Spring
16. Bearing sleeve
17. Adjusting ring
18. Setting means, positioning pins
19. Rotor
20. Pivot pins
21. Tool flange
22. Spring bolts
23. Tools
25. Exhaust pipe
30. Deflection belt
31a. First movable deflection roller
31b. Second movable deflection roller, movable tensioning roller
31c. First non-movable deflection roller
31d. Second non-movable deflection roller
32. Carriage
33. Spindle
34. Track 50. Planetary gearing
51. Planetary wheels
52. Sun wheel
53. Shaft
54. Fifth toothed belt wheel
55. Hollow body
55a. Inner toothing of the hollow body, annulus gear
100. Device according to first embodiment
200. Device according to second embodiment
300. Device according to third embodiment
400. Removal device
401, 402. Clamping jaws
401a, 401b, 402a, 402b. Compressed air connections
403. First frame
404. Pressure pistons
405. Torsion spring
406. Surface of the clamping jaws
407. Feet
408. Second frame
λ Knife-pivot-angle
η Adjusting ring-adjustment-angle
ψ. Adjusting ring-rotation-angle
φ. Adjusting ring-total-angle
Ka. Cable
K1. Insulating sheath
K2. Shielding foil
K3. Shielding braid
K4. Dielectric
K5. Inner conductor
EK. Incision in the cable
L. Longitudinal axis of the cable
S. Predetermined breaking point in the shielding foil

The invention claimed is:

1. A method for automatically removing a shielding foil of an electrical cable with a longitudinal axis (L) via a cable processing equipment having a controller, said cable having, going radially outward from the longitudinal axis, at least one inner conductor, a dielectric, the shielding foil and an insulating sheath, the method comprising the following steps:
  a. creating an incision of a first depth in the insulating sheath of the electrical cable via at least one radially adjustable perforation tool of the cable processing equipment, whereby the first depth is smaller than or the same as a thickness of the insulating sheath;
  b. creating a predetermined breaking point in the shielding foil through pressing in of the at least one radially adjustable perforation tool through the incision produced in step a. until the perforation tool has reached a second depth, wherein the second depth corresponds to at least the thickness of the insulating sheath plus at least half of a thickness of the shielding foil, wherein the shielding foil comprises a metallic part and the perforation tool is connected to means for detection of a contact with an electrically conductive object, and wherein the pressing in of the perforation tool is stopped upon, or at a radial distance inward after, contact of the perforation tool with the metallic part of the shielding foil is detected;
  c. tearing the shielding foil at the predetermined breaking point; and
  d. removing the shielding foil.

2. The method according to claim 1, wherein between steps b. and c. or between the steps c. and d. the perforation tool is put back in a position outside of the insulating sheath.

3. The method according to claim 1, wherein between steps a. and b., the insulating sheath is partially or completely removed.

4. The method according to claim 1, wherein the cable has a shielding braid between said dielectric and said shielding foil, and wherein the pressing in of the perforation tool is stopped as soon as a contact of the perforation tool with the shielding braid is detected.

5. The method according to claim 1, wherein a relative position of the perforation tool with respect to the longitudinal axis during the detection of a contact of the perforation tool with the metallic part of the shielding foil, or with a shielding braid located between said dielectric and said shielding foil, is transmitted to an analysis device.

6. The method according to claim 1, wherein after detection of a contact with the metallic part of the shielding foil or with a shielding braid located between said dielectric and said shielding foil, the perforation tool is advanced radially by a predetermined value in a direction of the inner conductor of the electrical cable.

7. The method according to claim 1, wherein step b. is repeated at least once after the perforation tool has been driven back and has been rotated about the electrical cable by an adjustment angle (α).

8. The method according to claim 1, wherein the perforation tool is a blade of a rotary stripping device, wherein the blade does not rotate during step b.

9. The method according to claim 1, wherein the perforation tool is a needle.

10. The method according to claim 9, wherein the needle is spring loaded.

11. The method according to claim 1, wherein the perforation tool is ultrasonically excited.

12. The method according to claim 11, wherein the ultrasonic excitation has a frequency between 10 and 100 kHz.

13. The method according to claim 1, whereby step c. and/or step d. is carried out by means of a removal device, which comprises clamping jaws for clamping the insulating sheath of the electrical cable or the shielding foil, wherein through a translational and/or rotational movement of the clamping jaws the shielding foil tears at the predetermined breaking point.

14. The method according to claim 13, wherein between step c. and d. and/or during step c. the clamping jaws carry out a reciprocating movement around the longitudinal axis (L).

15. The method according to claim 14, wherein with the reciprocating movement of the clamping jaws around the longitudinal axis (L) first a movement against a winding direction of the shielding braid is carried out.

16. The method according to claim 13, wherein through the movement of the clamping jaws the cable with the shielding foil is bent at the predetermined breaking point.

17. The method according to claim 13, wherein the clamping jaws move in a circular or helical way relative to the longitudinal axis (L) of the electrical cable.

18. The method according to claim 13, wherein the clamping jaws of the removal device are configured to be installed on a gimbal or Cardan suspension.

19. The method according to claim 13, wherein a surface of the clamping jaws coming into contact with the insulating sheath of the electrical cable or with the shielding foil comprises a material such that a coefficient of static friction prevailing between the clamping jaws and the insulating sheath is greater than that between a metal and the insulating sheath.

20. The method according to claim 19, wherein the surface of the clamping jaws coming into contact with the insulating sheath of the electrical cable or with the shielding foil consists of an elastomer.

21. The method according to claim 13, wherein the clamping jaws are configured to generate a suction force on the insulating sheath of the electrical cable or on the shielding foil.

22. The method according to claim 13, wherein a surface of the clamping jaws coming into contact with the insulating sheath of the electrical cable or with the shielding foil has a structure increasing static friction.

23. The method according to claim 13, wherein a removed portion of the insulating sheath of the electrical cable is configured to be separated from the clamping jaws by means of compressed air and/or by means of an ejector pin.

* * * * *